(12) United States Patent
Nakagiri et al.

(10) Patent No.: US 7,599,086 B2
(45) Date of Patent: Oct. 6, 2009

(54) PRINT CONTROL METHOD AND APPARATUS

(75) Inventors: Koji Nakagiri, Kanagawa (JP); Satoshi Nishikawa, Kanagawa (JP); Yasuo Mori, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 233 days.

(21) Appl. No.: 11/866,868

(22) Filed: Oct. 3, 2007

(65) Prior Publication Data

US 2008/0180701 A1 Jul. 31, 2008

Related U.S. Application Data

(60) Continuation of application No. 11/101,516, filed on Apr. 8, 2005, now Pat. No. 7,307,757, which is a division of application No. 09/703,687, filed on Nov. 2, 2000, now Pat. No. 6,999,198.

(30) Foreign Application Priority Data

| Nov. 2, 1999 | (JP) | ................. 11-313124 |
| Nov. 2, 1999 | (JP) | ................. 11-313125 |
| Nov. 2, 1999 | (JP) | ................. 11-313126 |

(51) Int. Cl.
*G06K 1/00* (2006.01)
*G06F 15/00* (2006.01)
*G06F 3/12* (2006.01)

(52) U.S. Cl. .................... 358/1.15; 358/1.13

(58) Field of Classification Search ............... 358/1.15, 358/1.1, 1.2, 1.4, 1.6, 1.13, 1.14, 1.18, 1.17
See application file for complete search history.

(56) References Cited

U.S. PATENT DOCUMENTS

| 5,289,569 | A  | 2/1994  | Taniguchi |
| 6,134,568 | A  | 10/2000 | Tonkin |
| 6,307,637 | B1 | 10/2001 | Kujirai |
| 6,616,359 | B1 | 9/2003  | Nakagiri et al. |
| 6,661,530 | B1 | 12/2003 | Munetomo et al. |
| 6,965,440 | B1 | 11/2005 | Nakagiri et al. |

FOREIGN PATENT DOCUMENTS

EP 803795 10/1997

(Continued)

OTHER PUBLICATIONS

Office Action, dated Mar. 23, 2009, in EP 00 123 734.6.

(Continued)

*Primary Examiner*—Douglas Q Tran
(74) *Attorney, Agent, or Firm*—Fitzpatrick, Cella, Harper & Scinto

(57) ABSTRACT

Upon designating bookbinding print, preview images are displayed in a layout after bookbinding. When "store" of intermediate data is designated in a print process, a spooler (302) stores intermediate data and an output job setup file in a spool file (303). When the stored job is selected, a previewer (306) displays a list of jobs, and displays a print preview image. In this case, upon setting bookbinding print, pages are displayed in a spread state and order after bookbinding. Also, the open direction (right or left open), and the bookbinding unit are also expressed on preview images.

24 Claims, 38 Drawing Sheets

FOREIGN PATENT DOCUMENTS

| | | |
|---|---|---|
| EP | 0 993 692 | 4/1999 |
| EP | 0 936 535 A2 | 8/1999 |
| EP | 993692 | 8/1999 |
| EP | 1096362 | 5/2001 |
| EP | 0 915 414 | 9/2006 |
| JP | 5962153 | 4/1984 |
| JP | 2155066 | 6/1990 |
| JP | 6348693 | 12/1994 |
| JP | 7112562 | 5/1995 |
| JP | 8324063 | 12/1996 |
| JP | 9185606 | 7/1997 |
| JP | 10040038 | 2/1998 |
| JP | 10309841 | 11/1998 |
| JP | 11099724 | 4/1999 |
| JP | 11-143664 | 5/1999 |
| JP | 11-170660 | 6/1999 |
| JP | 11219247 | 8/1999 |
| WO | WO 0026810 | 5/2000 |

OTHER PUBLICATIONS

Office Action, dated May 9, 2008, in JP 11-313124.

FIG. 11

| |
|---|
| TOTAL NUMBER OF PHYSICAL PAGES ~1101 |
| TOTAL NUMBER OF LOGICAL PAGES ~1102 |
| NUMBER OF COPIES ~1103 |
| COPY SET PRINT ~1104 |
| FINISHING INFORMATION ~1105 |
| ADDITIONAL PRINT INFORMATION ~1106 |

FIG. 18

| JOB EDIT | ? X |

COMBINED JOB NAME: Microsoft Word-EMPLOYEE MAGAZINE(SHANAIHOU) pr.doc

TOTAL PAGES:2

DELETE PAGE
PREVIEW

TARGET JOB LIST | PRINT SETUP

NUMBER OF COPIES(C): 1  COPIES(1-255)

PRINT METHOD: ONE-SIDED PRINT
☐ STAPLE
☐ SADDLE STITCHING(I)

☑ APPLY COMMON LAYOUT
PAGE LAYOUT(L): 1 PAGE/SHEET
LAYOUT ORDER(X):

☐ JOB BOUNDARY SETUP:

1801

MORE OPTIONS...

1802 — RESTORE DEFAULTS    OK    CANCEL    HELP

FIG. 31

DETAILED SETTINGS FOR BOOKLET ? ☒

BOOKLET PRINTING METHOD:
- ⦿ ALL PAGES AT ONCE
- ○ DIVIDE INTO SETS

1 ⬍ SHEETS PER SET[1-15]

☐ USE BOOKLET GUTTER SETTINGS  0.2 ⬍ IN[0.0-1.2]

[OK] [CANCEL] [HELP]

3101

3102

TOTAL PAGES:8

1  2  3  4  5  6  7  8

PRINT CONTROL METHOD AND APPARATUS

This application is a continuation application of U.S. application Ser. No. 11/101,516, filed Apr. 8, 2005, now allowed, which is a divisional application of U.S. application Ser. No. 09/703,687, filed Nov. 2, 2000, which issued Feb. 14, 2006 as U.S. Pat. No. 6,199,198, both of which are incorporated herein by reference.

FIELD OF THE INVENTION

The present invention relates to a print control method, apparatus, and medium and, more particularly, to a print control method, apparatus, and medium in a system including an information processing apparatus such as a personal computer or the like, and a printer.

BACKGROUND OF THE INVENTION

Upon printing data such as text data, image data, or the like edited by an application program for editing text or image data, a print preview function that presents an image to be printed on the screen in a print layout to the user before the image is actually printed on a paper sheet is known.

The user can repetitively re-edit data until an ideal layout is realized by checking an image printed using this print preview function.

However, the print preview function provided by the application program cannot display, as a preview image, an image which reflects various print conditions that a printer driver can set. For example, when the binding margin of sheets is designated by the printer driver, the print preview function of the application program cannot display a preview image that reflects such designation. For this reason, the layout of the preview image becomes different from that of an image to be actually printed, thus losing the significance of print preview.

SUMMARY OF THE INVENTION

The present invention has been made in consideration of the aforementioned prior art, and has as its object to provide a print control method and apparatus, which can display a print preview image that accurately reflects print setups of the layout and the like, i.e., can display a print preview image that reflects the layout after bookbinding especially when bookbinding print is designated.

It is another object of the present invention to provide a preview image display method for displaying a print preview image in a print control apparatus having a bookbinding print function of printing to complete a copy of book bound by stacking bookbinding units obtained by folding printed sheets once in units of a designated number of sheets, comprising:

the rendering step of laying out pages in an order after bookbinding and rendering images of the pages when bookbinding print is designated; and the display step of displaying the images of the pages rendered in the rendering step as preview images.

More preferably, the rendering step includes the step of rendering while dividing pages in units of bookbinding units.

More preferably, the rendering step includes the step of laying out pages in a designated open direction.

More preferably, the rendering step includes the step of rendering while dividing pages into pairs of pages each of which form a spread after bookbinding.

More preferably, when one of right and left open directions is designated as the open direction, pages are rendered with pages that form spreads being located at neighboring positions in the designated direction.

More preferably, when a top open direction is designated as the open direction, pages are rendered with pages that form spreads being located at vertically neighboring positions.

More preferably, the method further comprises the page number rendering step of rendering page numbers of the pages in correspondence with the rendered pages.

More preferably, the print control apparatus further has an insert function of inserting a cover page, and the rendering step includes the step of rendering a frame of the cover page to be inserted in the order after bookbinding when cover page insertion is designated.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 11 shows an example of a data format to be passed when the spool file manager 304 issues a print request of a physical page to the despooler 305;

FIG. 18 shows an example of a window of the setup change editor 307;

FIG. 31 shows an example of preview images when an all-page unit setup is designated;

DETAILED DESCRIPTION OF THE PREFERRED EMBODIMENTS

Preferred embodiments of the present invention will be described hereinafter.

<Arrangement of Printer Control System>

Figure 1:
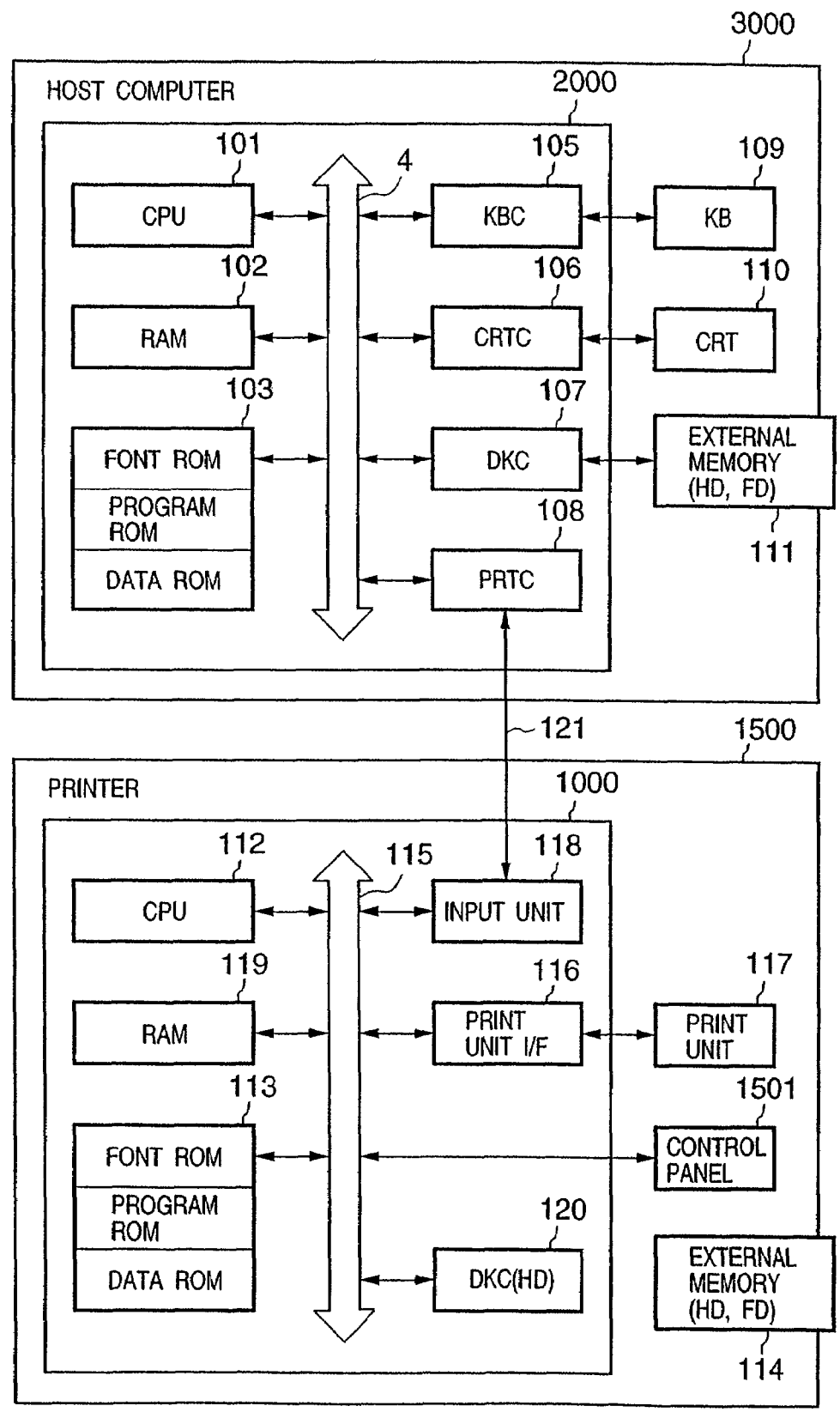
FIG. 1 is a block diagram for explaining the arrangement of a print control apparatus according to an embodiment of the present invention.

FIG. 1 is a block diagram for explaining the arrangement of a printer control system according to an embodiment of the present invention. Note that the present invention can be applied to any of a standalone device, a system built by a plurality of devices, and a system in which devices are connected via a network such as a LAN, WAN, or the like to execute processes, as long as the functions of the present invention are implemented.

Referring to FIG. 1, a host computer 3000 comprises a CPU 101 that processes a document including figures, images, text, tables (including a spreadsheet or the like), and the like on the basis of a document processing program stored in a program ROM in a ROM 3 or an external memory 111, and systematically controls devices connected to a system bus 104. The program ROM in the ROM 103 or external memory 111 stores an operating system program (to be referred to as an OS hereinafter) or the like as a control program of the CPU 101, a font ROM in the ROM 103 or the external memory 111 stores font data or the like used in the document process, and a data ROM in the ROM 103 or the external memory 111 stores various data used upon executing the document process. A RAM 102 serves as a main memory, work area, and the like of the CPU 101.

A keyboard controller (KBC) 105 controls key input from a keyboard 109 and a pointing device (not shown). A CRT controller (CRTC) 106 controls display of a CRT display (CRT) 110. Reference numeral 107 denotes a disk controller (DKC) which controls access to the external memory 111 such as a hard disk (HD), floppy disk (FD), and the like, which store a boot program, various application programs, font data, user files, edit files, a printer control command generation program (to be referred to as a printer driver hereinafter), and the like. A printer controller (PRTC) 108 is connected to a printer 1500 via a two-way interface (interface) 121 to implement a communication control process with the printer 1500.

Note that the CPU 101 rasterizes outline font data on a display information RAM assured on, e.g., the RAM 102 to realize WYSIWYG on the CRT 110. The CPU 101 opens various registered windows on the basis of commands instructed by a mouse cursor (not shown) or the like on the CRT 110, and executes various data processes. The user can set a print processing method for the printer driver including the printer setup and print mode selection by opening a window that pertains to the print setups upon executing a print process.

The printer 1500 is controlled by a CPU 112. The printer CPU 112 outputs an image signal as output information to a print unit (printer engine) 117, which is connected to a system bus 115, on the basis of a control program or the like stored in a program ROM in a ROM 113, or a control program or the like stored in an external memory 114. The program ROM in the ROM 113 stores the control program and the like of the CPU 112. A font ROM in the ROM 113 stores font data or the like used upon generating the output information, and a data ROM in the ROM 113 stores information and the like used on the host computer when the printer has no external memory 114 such as a hard disk or the like.

The CPU 112 can communicate with the host computer via an input unit 118, and can inform the host computer 3000 of information or the like in the printer. A RAM 119 serves as a main memory, work area, and the like of the CPU 112, and its memory size can be expanded by an option RAM connected to an expansion port (not shown). Note that the RAM 119 is used as an output information rasterizing area, environment data storage area, NVRAM, and the like. Access to the aforementioned external memory 114 such as a hard disk (HD), IC card, or the like is controlled by a memory controller (DKC) 120. The external memory 114 is connected as an option, and stores font data, an emulation program, form data, and the like. Reference numeral 1501 denotes a control panel on which operation switches, LED indicators, and the like are arranged.

The number of external memories 114 is not limited to one, but a plurality of external memories 114 may be connected. That is, a plurality of option font cards in addition to built-in fonts and external memories that store programs for interpreting printer control languages of different language systems may be connected. Furthermore, an NVRAM (not shown) may be connected, and may store printer mode setup information from the control panel 1501.

Figure 2:
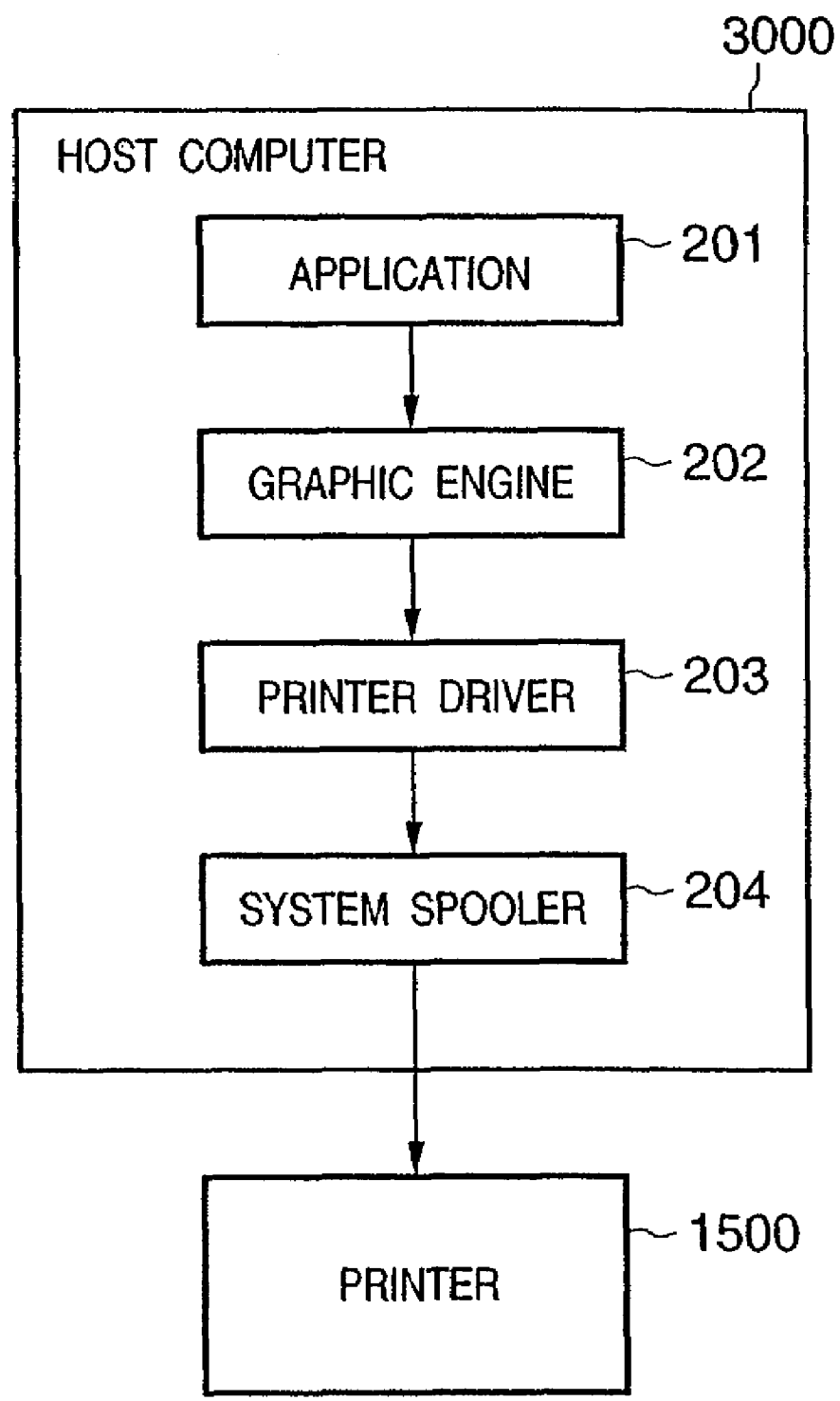
FIG. 2 is a block diagram showing the arrangement of a typical print system built by a host computer to which a printer is connected.

FIG. 2 shows the configuration of typical print processing software in the host computer to which a printing apparatus such as a printer or the like is connected directly or via a network. An application program (to be simply referred to as an application hereinafter) 201, graphic engine 202, printer driver 203, and system spooler 204 are program modules which are stored as files in the external memory 111, and are loaded onto the RAM 102 by the OS or a module that uses the corresponding module upon execution. The application 201 and printer driver 203 can be added to the files stored in the HD using the FD in the external memory 111 or a CD-ROM (not shown), or via a network (not shown). The application 201 stored in the external memory 111 is loaded onto the RAM 102 upon execution. When the application 201 executes a print process with respect to the printer 1500, it outputs (renders) data using the graphic engine 202 which is similarly loaded onto the RAM 102 upon execution.

The graphic engine 202 loads a printer driver 203 which is prepared for each printing apparatus from the external memory 111 onto the RAM 102, and sets the output from the application 201 in the printer driver 203. The graphic engine 202 then converts a GDI (Graphic Device Interface) function received from the application 201 into a DDI (Device Driver Interface) function, and outputs the DDI function to the printer driver 203. The printer driver 203 converts the DDI function received from the graphic engine 202 into a control command, e.g., PDL (Page Description Language) that the printer can recognize. The converted printer control command is output as print data to the printer 1500 via the interface 121 by the system spooler 204 which is loaded onto the RAM 102 by the OS.

Figure 3:
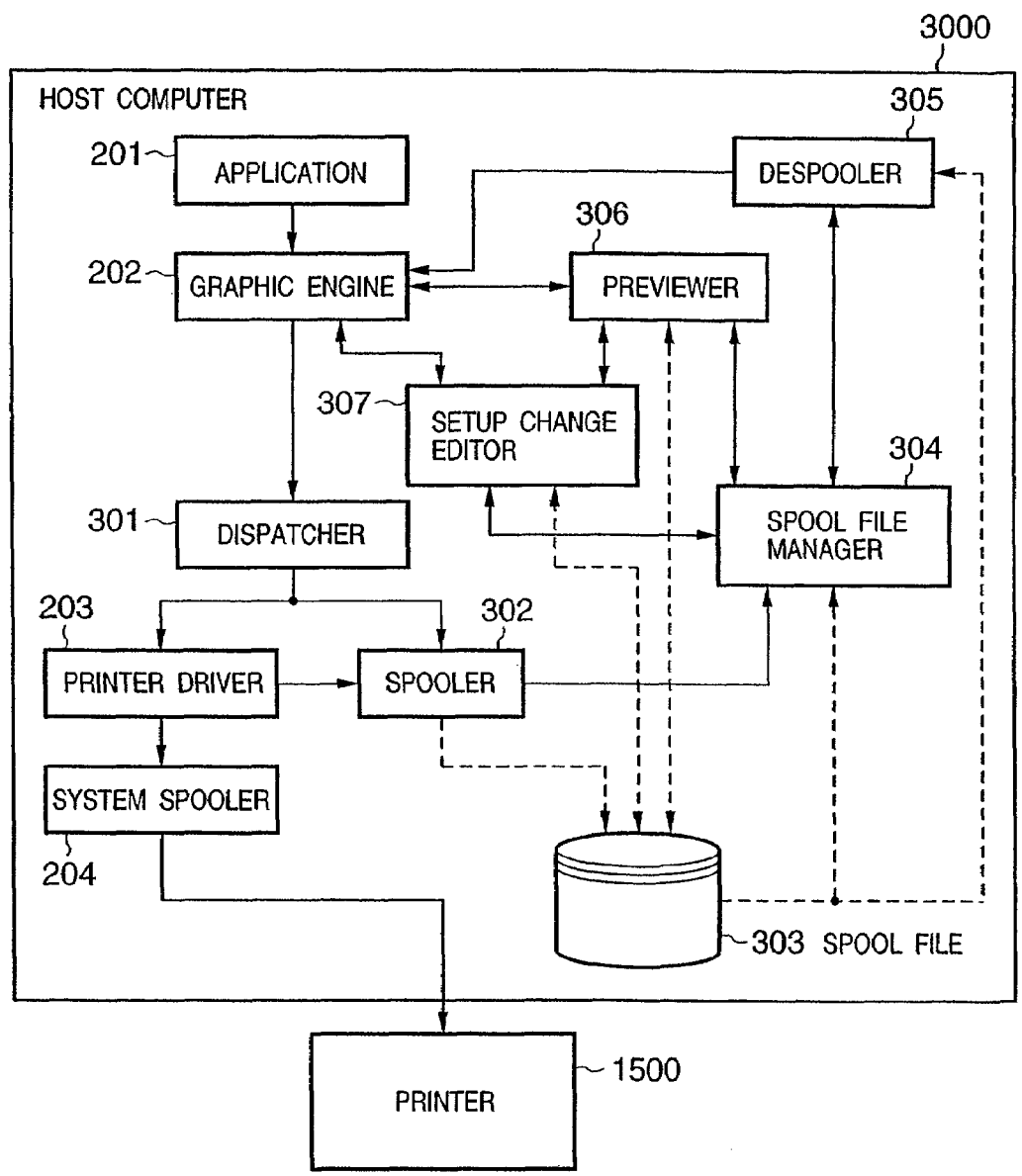
FIG. 3 is a block diagram showing the arrangement of a print system which temporarily spools intermediate codes before a print command from an application is converted into a print control command.

The print system of this embodiment also has an arrangement for temporarily spooling print data from the application as intermediate codes, as shown in FIG. 3, in addition to the print system constructed by the printer and host computer shown in FIG. 2.

<Print-Related Software Modules in Embodiment>

FIG. 3 shows the expanded system of FIG. 2. This system temporarily generates a spool file 303 consisting of intermediate codes upon sending a print command from the graphic engine 202 to the printer driver 203. In the system shown in FIG. 2, the application 201 is released from the print process when the printer driver 203 has converted all print commands from the graphic engine 202 into printer control commands. By contrast, in the system shown in FIG. 3, a spooler 302 converts all print commands into intermediate code data, and the application 201 is released from the print process when it outputs print commands to the spool file 303. Normally, the latter system can shorten the processing time. In the system shown in FIG. 3, data as the contents of the spool file 303 can be processed. In this way, functions such as enlargement/reduction, reduced-scale print of a plurality of pages on one page, and the like that the application does not have can be implemented for print data from the application.

For these purposes, the system of this embodiment is attained by expanding the system shown in FIG. 2 to spool data as intermediate codes, as shown in FIG. 3. In order to process print data, setups are normally made from a window provided by the printer driver 203, which saves the setup contents on the RAM 102 or external memory 111.

The arrangement in FIG. 3 will be explained in detail below. As shown in FIG. 3, in this expanded processing system, a dispatcher 301 receives a DDI function as a print command from the graphic engine 202. When the print command (DDI function) that the dispatcher 301 receives from the graphic engine 202 is based on a print command (GDI function) issued from the application 201 to the graphic engine 202, the dispatcher 301 loads the spooler 302 stored in the external memory 111 onto the RAM 102, and sends the print command (DDI function) to the spooler 302 in place of the printer driver 203.

The spooler 302 interprets the received print command, converts it into intermediate codes in units of pages, and outputs the codes to the spool file 303. The spool file of intermediate codes stored in units of pages is called a page description file (PDF). Since one PDF corresponds to one print job, the spooled PDF is also often called a job or print job simply. The spooler 302 acquires processing setups (N-up, two-side, staple, color/monochrome designation, or the like) associated with print data set in the printer driver 203 from the printer driver 203, and saves them as a setup file for each job in the spool file 303. The setup file stored in units of jobs is called a job setup file (also called an SDF as an abbreviation for a spool description file). The job setup file will be described later. Note that the spool file 303 is generated as a file on the external memory 111, but may be generated on the RAM 102. Furthermore, the spooler 302 loads a spool file manager 304 stored in the external memory 111 onto the RAM 102, and informs the spool file manager 304 of the generation state of the spool file 303. After that, the spool file manager 304 checks if a print process can be done in accordance with the contents of the processing setups associated with print data, which are saved in the spool file 303.

If the spool file manager 304 determines that the print process can be done using the graphic engine 202, it loads a despooler 305 stored in the external memory 111 onto the RAM 102, and instructs the despooler 305 to execute the print process of the page description files of intermediate codes described in the spool file 303.

The despooler 305 processes the page description files of intermediate codes included in the spool file 303 in accordance with the job setup file which is included in the spool file 303 and includes processing setup information, re-generates a GDI function, and outputs it via the graphic engine 202 once again.

When the print command (DDI function) that the dispatcher 301 receives from the graphic engine 202 is based on a print command (GDI function) issued from the despooler 305 to the graphic engine 202, the dispatcher 301 sends the print command to the printer driver 203 in place of the spooler 302.

The printer driver 203 generates a printer control command described in a page description language or the like on the basis of the DDI function acquired from the graphic engine 202, and outputs the generated command to the printer 1500 via the system spooler 204.

Furthermore, FIG. 3 shows an example which includes a previewer 306 and setup change editor 307 in addition to the expanded system described so far, and allows a print preview process, print setup change process, and combination process of a plurality of jobs.

Figure 9:
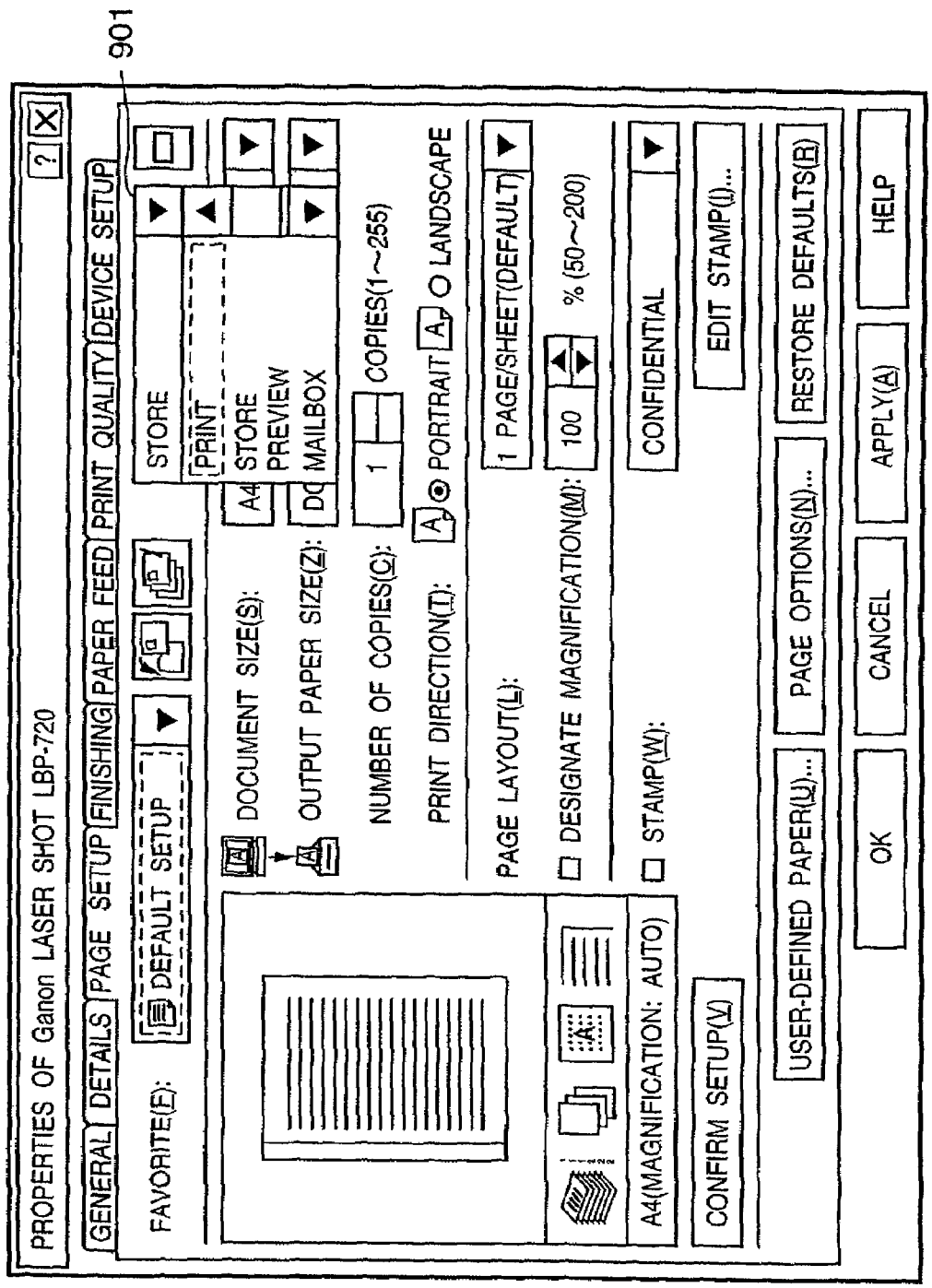
FIG. 9 shows an example of a print spool setup window.

In order to implement the print preview process, print setup change process, and combination process of a plurality of jobs, the user must designate "store" on a pull-down menu 901 as a means for "designating an output destination" in a property window of the printer driver shown in FIG. 9. When the user wants to only preview, he or she can select "preview" as designation of the output destination.

Figure 16:
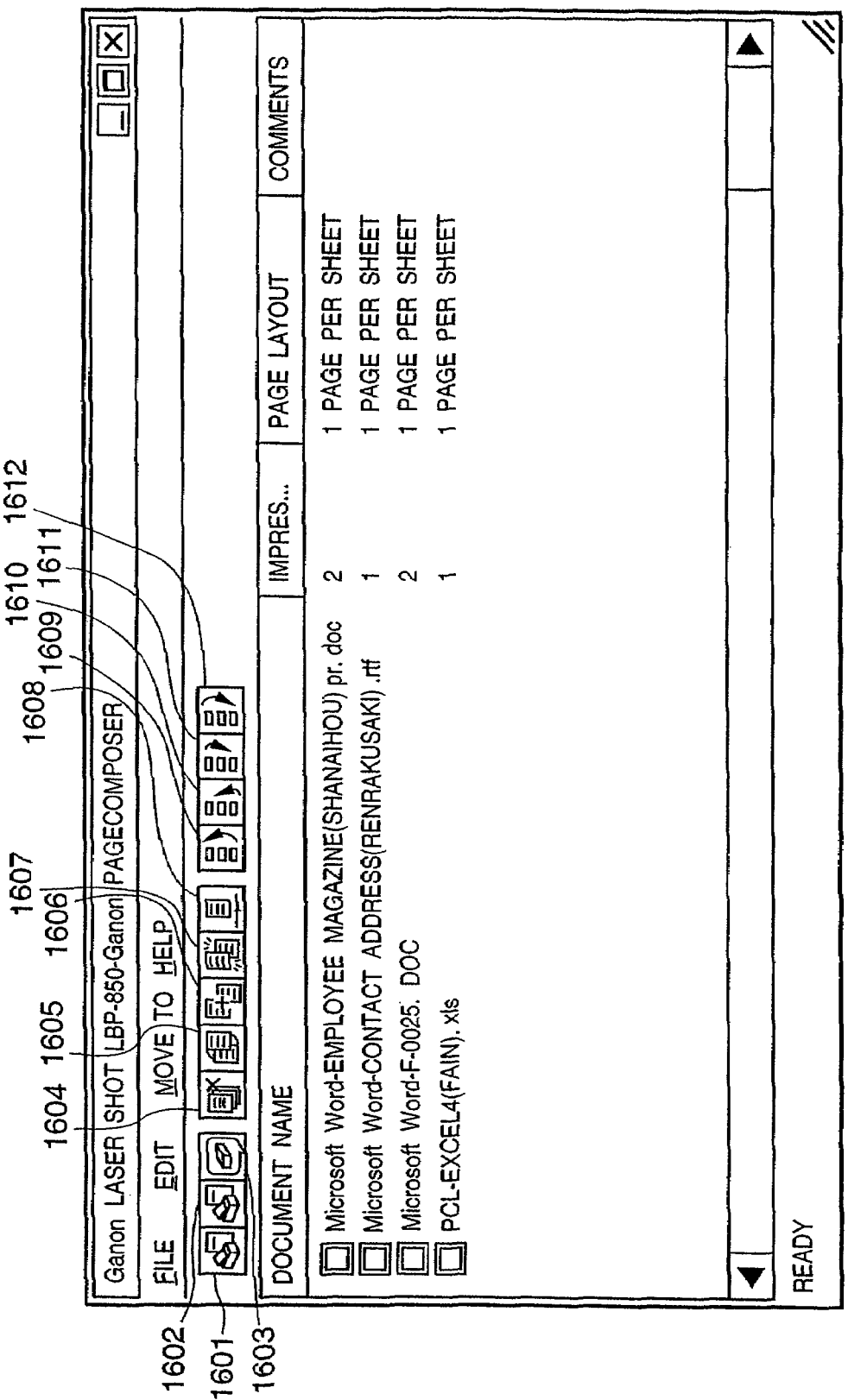
FIG. 16 shows an example of a window that displays a list of print jobs spooled in the spool file manager 304.

The contents set on the property window of the printer driver in this way are stored in a structure (for example, a structure called DEVMODE in Windows OS available from Microsoft Corp.) provided by the OS as a setup file. That structure includes, e.g., store designation. Store designation is a setup for storing a print command and processing setup in the spool file 303. When the spool file manager 304 reads the processing setup via the printer driver 203 and that setup includes store designation, the spool file 303 generates and stores a page description file and job setup file, as described above. Then, the window of the spool file manager 304 pops up, as shown in FIG. 16, and displays a list of jobs spooled by the spool file 303. FIG. 16 shows an example wherein four jobs are spooled, and operations for each job can be selected from a menu bar or by pressing menu icons below the menu bar. Operations that can be selected from the menu bar are the same as those of the menu icons. The following types of operations are available. Note that each operation is done while selecting a desired job. That is, there are 12 operations:

(1) "print": executes a given job while selecting that job. That is, this operation prints the designated spool file.

(2) "save & print": executes a print process while saving a job of the selected intermediate codes.

(3) "preview": displays output preview in consideration of the print setups.

(4) "delete": deletes the selected job.

(5) "copy": generates a copy of the selected job.

(6) "combine": combines a plurality of jobs into one job.

(7) "divide": divides the combined job into a plurality of original jobs.

(8) "job edit" changes the print setups (layout setup, finishing setup, and the like) of an independent or combined job.

(9) "move to top": moves the print order of a given job to the top of a job list.

(10) "move up by one": advances the print order of a given job by one.

(11) "move down by one": delays the print order of a given job by one.

(12) "move to last": moves the print order of a given job to the last of a job list.

When "preview" of an independent or combined job is designated on the window (FIG. 16) of the spool file manager, the previewer 306 stored in the external memory 111 is loaded onto the RAM 102, and is instructed to execute a preview process of a job of the intermediate codes described in the spool file 303.

(Previewer)

The previewer 306 sequentially reads out page description files (PDF) of intermediate codes included in the spool file 303, processes them in accordance with the contents of processing setup information included in the job setup file (SDF) stored in the spool file 303, and outputs a GDI function to the graphic engine 202. The graphic engine 202 can output a preview window onto the screen by outputting rendering data on its own client area.

The graphic engine 202 can appropriately render in correspondence with the designated output destination. The previewer 306 implements preview by the method of processing intermediate codes included in the spool file 303 in accordance with the contents of the processing setups included in the spool file 303 and outputting them using the graphic engine as in the despooler 305. In this way, since the processing setups set in the printer driver are stored as a job setup file in the spool file 303 and data of the page description file are processed and output based on the job setup file, a print preview approximate to an actual printout can be provided to the user in correspondence with the way actual rendering data is printed, and designated processes (e.g., an N-up process (for laying out and printing N logical pages on one physical page), a two-sided print process, a bookbinding print process, a stamp process, and the like). Since the preview function of conventional application software such as document creation software renders based on page setups in that application, the print setups in the printer driver are not reflected in preview, and the user cannot recognize a preview of an image to be actually printed out.

One logical page is one page in data created by the application, and one physical page corresponds to one surface of one sheet (e.g., one paper sheet). More specifically, when the N-up process is designated, images for N pages created by the application are laid out and printed on a single sheet in a reduced scale.

Figure 17:
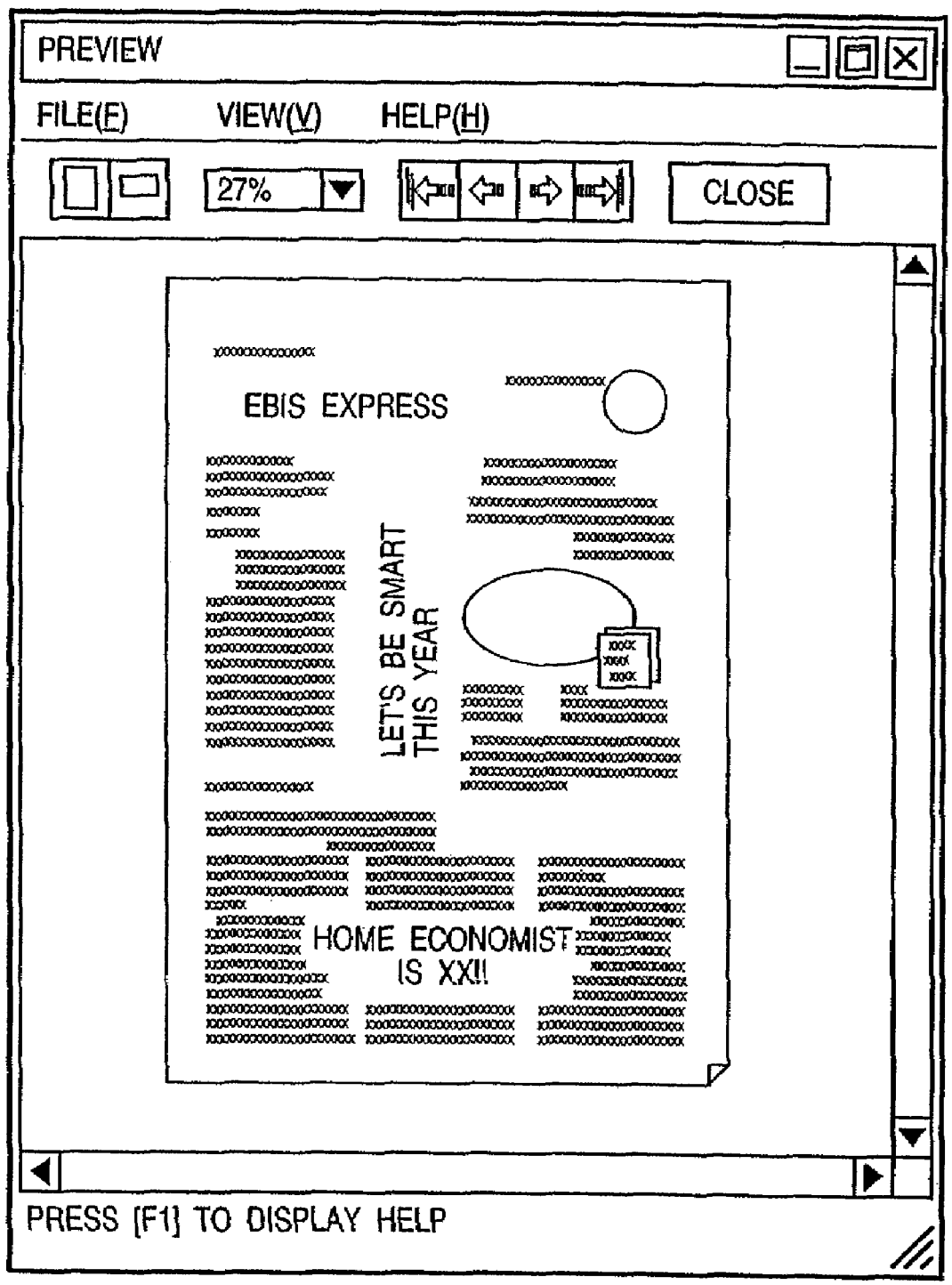
FIG. 17 shows an example of a window of a previewer 306.

By executing the preview process in this fashion, a large preview image of an image processed in accordance with the print processing setups saved in the spool file 303 is displayed on the screen by the previewer 306, as shown in FIG. 17. After that, the previewer 306 is closed in response to the user's non-display instruction (designation of "close"), and the control shifts to the window (FIG. 16) of the spool file manager.

When the user wants to print the contents displayed by the previewer 306, he or she issues a print request by selecting "print" or "save & print" on the spool file manager 304. In response to the print request, the despooler 305 generates a GDI function by processing each page description file based on the job setup file, and passes it to the graphic engine 202. Then, a print command is sent to the printer driver 203 via the dispatcher 301, thus executing the print process.

(Setup Change Editor)

A setup change process using the setup change editor 307 will be explained below.

The setup change process can be done for a "store"-designated job in FIG. 9 as in the preview process. The window of the spool file manager 304 pops up in the same sequence as in the preview process, and displays a list of spooled jobs. A setup change instruction is issued by designating "job edit" for the selected spool file on the window (FIG. 16) of the spool file manager. When the setup change instruction is issued, the setup change editor 307 stored in the external memory 111 is loaded onto the RAM and is instructed to display current or default processing setups. Then, a job setup window shown in FIG. 18 is displayed.

The setup change editor 307 acquires the job setup file of the "job edit"-designated job, and default values of the job setup window in FIG. 18 are changed on the basis of setup items designated in that job setup file. In the example shown in FIG. 18, the job setup file of the "job edit"-designated file is designated with the number of copies: 1, print method: one-sided, staple: none, layout: 1 page/sheet, and the like.

This setup change editor 307 can also make a small preview output on the window shown in FIG. 18 by processing each page description file of intermediate codes stored in the spool file 303 in accordance with the contents of the processing setups included in the job setup file stored in the spool file 303, and outputting them onto its own client area using the graphic engine.

Also, this editor can change and correct the contents of the processing setups included in the job setup file stored in the spool file 303. In this case, the user interface on the setup change editor 307 may have items that the printer driver 203 can set, or the user interface of the printer driver 203 itself may be called. As shown in FIG. 18, the number of copies, the print method (one-side, two-side, bookbinding print), staple (saddle finisher, or the like), page layout, layout order, and the like can be designated. Upon pressing "detailed setups", most of items that the printer driver can designate can be re-set. However, changes of setups that pertain to print quality such as the resolution, graphic mode, and the like are not permitted.

When the changed items are confirmed in accordance with a confirmation request on the setup change editor 307, the control shifts to the spool file manager 304. The confirmed print setups that have been changed are saved. In this case, the setups are not saved in an original job setup file, but a new job output setup file used in the job edit process or the like is created to save the setups. Details of the job output setup file will be described later using FIG. 10 and the subsequent figures.

If the user wants to print in accordance with the changed setup contents as in the previewer 306, the spool file manager 304 issues a print request. The print request is sent to the graphic engine 202, and a print command is sent to the printer driver 203 via the dispatcher 301, thus executing the print process.

On the window (FIG. 16) of the spool file manager, the user can designate to combine a plurality of print jobs to execute them as a single print job. This process is also premised on the "store"-designated job on the property window of the printer driver shown in FIG. 9 as in the preview and setup change processes.

When the user wants to combine print jobs, he or she calls the printer driver 203 from the application 201, and selects "store" from the user interface shown in FIG. 9. With this selection, the print job is stored in the spool file 303, and the window (FIG. 16) of the spool file manager pops up, as shown in FIG. 16. The spooled job is displayed as a list on the window of the spool file manager. By repeating the same operation from the application 201, a plurality of jobs are spooled, and a list of jobs is displayed on the window of the spool file manager 304.

When the user selects a plurality of jobs from the list and designates "combine", the setup change editor 307 stored in the external memory 111 is loaded onto the RAM 102 and is instructed to display the processing setups of the first job on the list or default setups. Then, a combine setup window shown in FIG. 18 is displayed. In this embodiment, the same window as the setup change window is used as the combine setup window, but another window may be used.

The setup change editor 307 processes each page description file of intermediate codes included in the spool file 303 in accordance with the contents of the processing setups included in job setup information stored in the spool file 303, and outputs the processed data for all jobs designated as the combined job to its own client area using the graphic engine 202, thus outputting these jobs on the screen. In this case, small preview images of all the selected jobs can be displayed on the preview region shown in FIG. 18. Upon generating the combined job, a job output setup file that expands the job setup files of the individual jobs is generated. This job output setup file is also generated in the job edit process. That is, one job 15, output setup file is generated for each job and also for the combined job.

In this case, images of the individual jobs may be displayed using the processing setups before they are combined, or may be displayed by changing and correcting their setups to common processing setups of the combined job. In this case, the user interface on the setup change editor 307 may have items that the printer driver 203 can set, or the user interface of the printer driver 203 itself may be called.

When the combined job and changed items are confirmed in accordance with a confirmation request on the setup change editor 307, as described above, the control shifts to the spool file manager 304. With these operations, the plurality of jobs selected previously are displayed as a single combined job on the window of the spool file manager.

When the user wants to print in accordance with the changed setup contents as in the previewer 306, the spool file manager 304 issues a print request. The print request is sent to the graphic engine 202, and a print command is sent to the printer driver 203 via the dispatcher 301, thus executing the print process.

<Arrangement of Laser Beam Printer>

Figure 4:
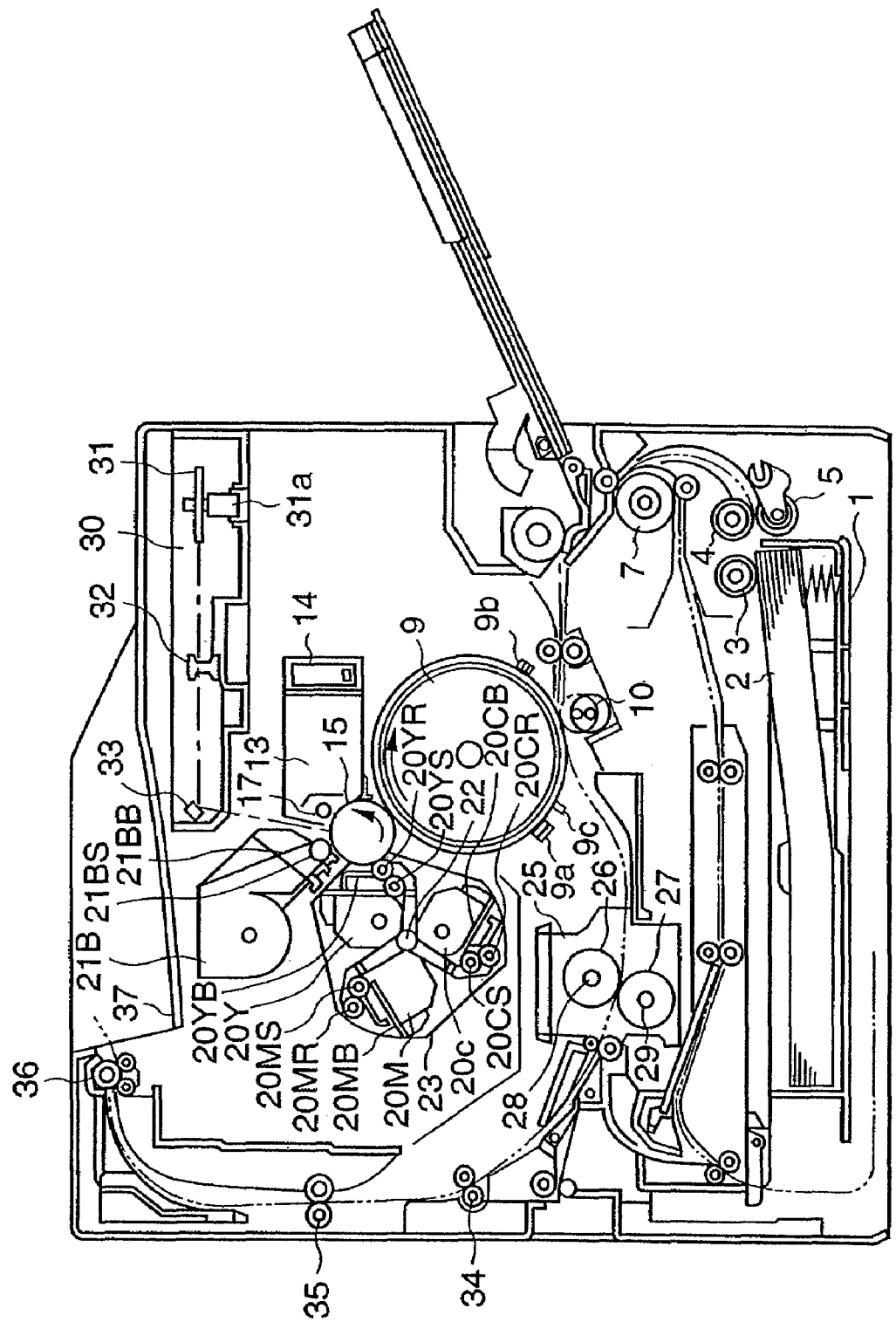
FIG. 4 is a sectional view for explaining the printer in the present invention.

FIG. 4 is a sectional view of a color laser printer having a two-sided print function as an example of the printer 1500.

This printer forms an electrostatic latent image by scanning the surface of a photosensitive drum 15 with a laser beam modulated by image data of each color obtained based on print data input from the host computer 3000 by a polygonal mirror 31. The electrostatic latent image is developed by toner to obtain a visible image, and visible images of all colors are transferred in turn onto an intermediate transfer drum 9 to form a color visible image. The color visible image is transferred onto a transfer medium 2, thus fixing the color visible image on the transfer medium 2. An image forming unit that makes the aforementioned control comprises a drum unit 13 having the photosensitive drum 15, a primary charger having a contact charging roller 17, a cleaning unit, a developing unit, the intermediate transfer drum 9, a paper feed unit including a paper cassette 1 and various rollers 3 and 4, a transfer unit including a transfer roller 10, and a fixing unit 25.

The drum unit 13 integrates the photosensitive drum (photosensitive body) 15 and a cleaner container 14 which has a cleaning mechanism that also serves as a holder of the photosensitive drum 15. The drum unit 13 is detachably supported on a printer main body, and is easily exchanged as a unit in correspondence with the service life of the photosensitive drum 15. The photosensitive drum 15 is prepared by applying an organic photoconductor layer on the outer surface of an aluminum cylinder, and is rotatably supported by the cleaner container 14. The photosensitive drum 15 rotates upon receiving the driving force of a driving motor (not shown), and the driving motor rotates the photosensitive drum 15 counterclockwise in accordance with image forming operation. An electrostatic latent image is formed by selectively exposing the surface of the photosensitive drum 15. In a scanner unit 30, a modulated laser beam is reflected by the polygonal mirror which rotates by a motor 31a in synchronism with the horizontal sync signal of an image signal, and strikes the photosensitive drum via a lens 32 and reflection mirror 33.

The developing unit comprises three color developers 20Y, 20M, and 20C for developing yellow (Y), magenta (M), and cyan (C) images, and a single black developer 21B for developing a black (B) image. The color developers 20Y, 20M, and 20C and the black developer 21B respectively have sleeves 20YS, 20MS, 20CS, and 21BS, and coating blades 20YB, 20MB, 20CB, and 21BB which are in press contact with the outer surfaces of these sleeves 20YS, 20MS, 20CS, and 21BS. Also, the three color developers 20Y, 20M, and 20C respectively have coating rollers 20YR, 20MR, and 20CR.

The black developer 21B is detachably attached to the printer main body, and the color developers 20Y, 20M, and 20C are detachably attached to a developing rotary 23 which rotates about a rotation shaft 22.

The sleeve 21BS of the black developer 21B is set to have a gap as small as, e.g., 300 µm with respect to the photosensitive drum 15. In the black developer 21B, toner is fed by a feed member built in the developer, and is applied by the coating blade 21BB to the outer surface of the sleeve 21BS which rotates clockwise, thus charging the toner by triboelectrification. By applying a developing bias to the sleeve 21BS, the photosensitive drum 15 undergoes development in accordance with an electrostatic latent image, thus forming a visible image on the photosensitive drum 15 by black toner.

The three color developers 20Y, 20M, and 20C rotate upon rotation of the developing rotary 23 in image formation, and a predetermined one of the sleeves 20YS, 20MS, and 20CS faces the photosensitive drum 15 to have a gap as small as 300 µm. In this manner, a predetermined one of the color developers 20Y, 20M, and 20C stops at the developing position where it faces the photosensitive drum 15, thus forming a visible image on the photosensitive drum 15.

Upon forming a color image, the developing rotary 23 rotates once per rotation of the intermediate transfer drum 9 to execute developing processes in the order of the yellow developer 20Y, magenta developer 20M, cyan developer 20C, and black developer 21B. After four rotations of the intermediate transfer drum 9, visible images are formed in turn by yellow, magenta, cyan, and black toners, thus forming a full-color visible image on the intermediate transfer drum 9.

The intermediate transfer drum 9 contacts the photosensitive drum 15 and rotates upon rotation of the photosensitive drum 15. The drum 9 rotates clockwise upon forming a color image, and four visible images are transferred in turn onto the drum 9 from the photosensitive drum 15. The transfer roller 10 (to be described later) contacts the intermediate transfer drum 9 upon forming an image, and clamps and conveys a transfer medium 2, thus simultaneously transferring a color visible image on the intermediate transfer roller 9 onto the transfer medium 2. A TOP sensor 9a and RS sensor 9b for detecting the position of the intermediate transfer drum 9 in its rotational direction, and a density sensor 9c for detecting the density of the toner image transferred onto the intermediate transfer drum are arranged around the intermediate transfer drum.

The transfer roller 10 comprises a transfer charger which is supported to be movable toward or away from the photosensitive drum 15, and is prepared by winding a middle-resistance foamed elastic member around a metal shaft.

The transfer roller 10 is located at its lower position, as indicated by the solid line in FIG. 4, so as not to disturb color visible images, while color visible images are transferred in turn onto the intermediate transfer drum 9. After the four color visible images are formed on the intermediate transfer drum 9, the transfer roller 10 moves to its upper position indicated by the dotted line in FIG. 1 by a cam member (not shown) in synchronism with the transfer timing of the formed full-color visible image onto the transfer medium 2. In this manner, the transfer roller 10 is brought into press contact with the intermediate transfer drum 9 at a predetermined pressure via the transfer medium 2, and is applied with a bias voltage, thus transferring the full-color visible image on the intermediate transfer drum 9 onto the transfer medium 2.

The fixing unit 25 fixes the transferred full-color visible image while conveying the transfer medium 2, and comprises a fixing roller 26 for heating the transfer medium 2, and a pressing roller 27 for pressing the transfer medium 2 against the fixing roller 26. The fixing roller 26 and pressing roller 27 are formed into a hollow shape, and heaters 28 and 29 are respectively built therein. That is, the transfer medium 2 that holds the full-color visible image is conveyed by the fixing roller 26 and pressing roller 27, and the toner image is fixed on its surface by applied heat and pressure.

After the visible image is fixed, the transfer medium 2 is exhausted onto an exhaust unit 37 via exhaust rollers 34, 35, and 36, thus ending the image forming operation.

The cleaning means cleans any residual toner on the photosensitive drum 15 and intermediate transfer drum 9, and waste toner after the toner image formed on the photosensitive drum 15 is transferred onto the intermediate transfer drum 9 or waste toner after the four color visible images formed on the intermediate transfer drum 9 are transferred onto the transfer medium 2 is stored in the cleaner container 14.

The transfer medium (recording sheet) 2 which is to undergo a print process is picked up from the paper tray or cassette 1 by the roller 3, and is conveyed while being clamped between the intermediate transfer roller 9 and transfer roller 10 to record a color toner image thereon. The toner image is fixed when the transfer medium 2 passes through the fixing unit 25. A guide 38 forms a convey path to guide the recording sheet toward the upper exhaust unit in a one-sided print process, but forms a path to guide it to a lower two-side unit in a two-sided print process.

The recording sheet guided to the two-side unit is temporarily fed to a portion (a convey path indicated by the two-dashed chain line) below the tray 1 by convey rollers 40, is then conveyed in the reverse direction, and is fed to a two-side tray 39. On the two-side tray 39, the paper sheet is upside down to that placed on the paper tray 1, and its convey direction is reversed. In this state, a toner image is transferred and fixed again, thus achieving the two-sided print process.

<Saving Process of Print Intermediate Data>

Figure 5:
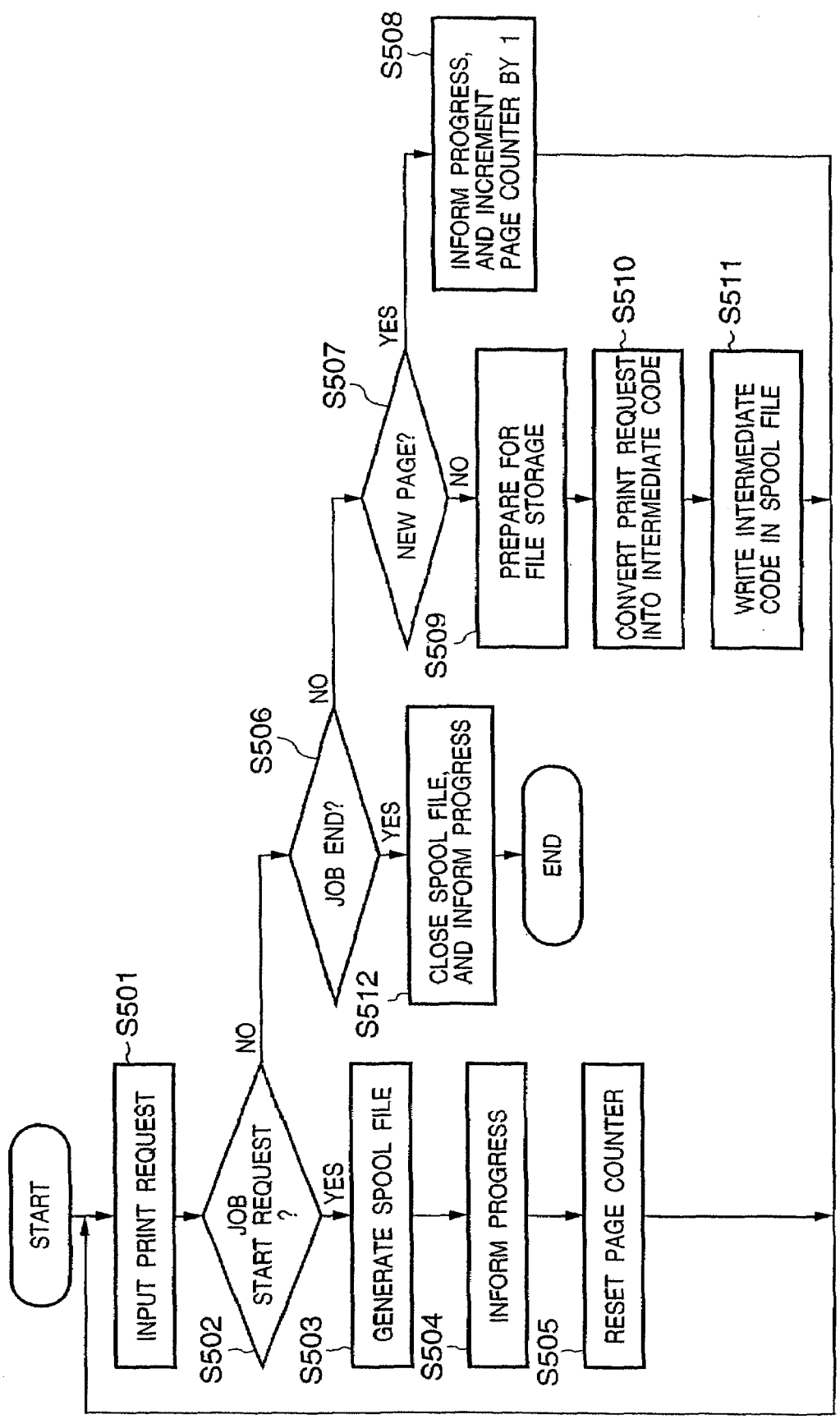
FIG. 5 is a flow chart showing the process in a spooler 302.

FIG. 5 is a flow chart showing the processing in the step of saving in units of pages upon generating the spool file 303 in the spooler 302.

Figure 8:
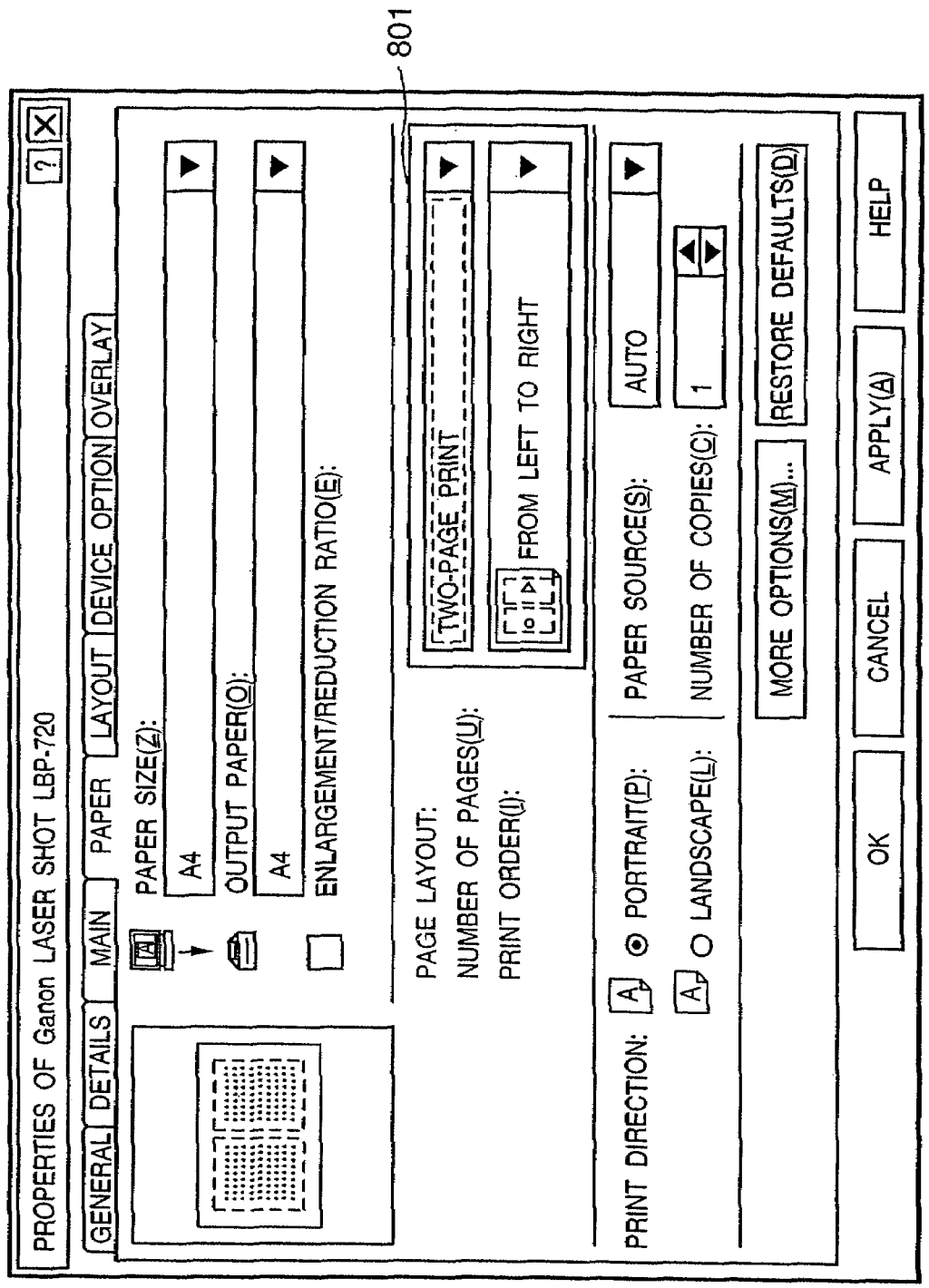
FIG. 8 shows an example of a print setup window.

In step 501, the spooler 302 receives a print request from the application via the graphic engine 202. The application displays a dialog that prompts the user to input print setups, as shown in FIG. 8, and the print setups input on this dialog are passed from the printer driver to the spooler 303. The setup input dialog shown in FIG. 8 includes a setup item 801 that determines the number of logical pages to be laid out per physical page, and the like.

In step 502, the spooler 302 checks if the received print request is a job start request. If it is determined in step 502 that the received print request is a job start request, the flow advances to step 503, and the spooler 302 generates a spool file 303 for temporarily saving intermediate data. Subsequently, the spooler 302 informs the spool file manager 304 of the progress of the print process in step 504, and resets its page counter to 1 in step 505. The spool file manager 304 reads and stores information, processing setups, and the like of a job, the print process of which has started, from the spool file 303.

On the other hand, if it is determined in step 502 that the received print request is not a job start request, the flow advances to step 506.

The spooler checks in step 506 if the received request is a job end request. If it is determined that the received request is not a job end request, the flow advances to step 507 to check if the received request is a new page request. If it is determined in step 507 that the received request is a new page request, the flow advances to step 508 to inform the spool file manager 304 of the progress of the print process. The spooler 302 then increments the page counter, closes a page description file that stores intermediate codes, and generates the next page description file.

If it is determined in step 507 that the received print request is not a new page request, the flow advances to step 509, and the spooler 302 prepares for export of intermediate codes to a page description file.

In step 510, the spooler 302 converts a DDI function of the print request into intermediate codes to store the print request in the spool file 303. In step 511, the spooler 302 writes the print request (intermediate codes) that has been converted into a storable format in a page description file of the spool file 303 in step 510. After that, the flow returns to step 501 to receive a print request from the application again. The spooler 302 repeats a series of processes from steps 501 to 511 until it receives a job end request (EndDoc). The spooler 302 simultaneously acquires information such as processing setups and the like stored in the DEVMODE structure from the printer driver, and stores such information in the spool file 303 as a job setup file. On the other hand, if it is determined in step 506 that the print request from the application is a job end request, since the spooler 302 has received all print requests from the application, the flow advances to step 512 to inform the spool file manager 304 of the progress of the print process, thus ending the processing.

<Generation of Spool File>

Figure 6:
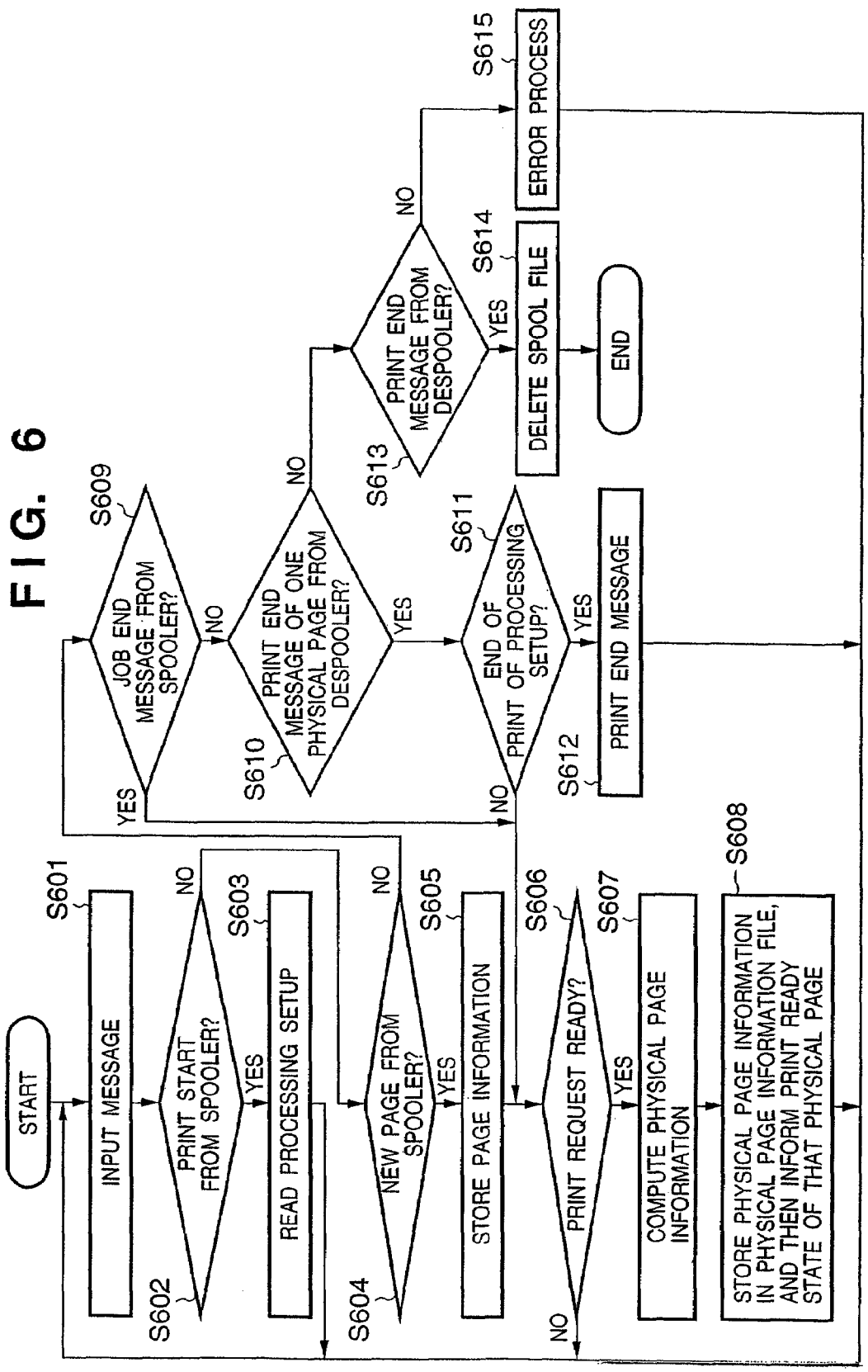
FIG. 6 is a flow chart showing print control in a spool file manager 304.

FIG. 6 is a flow chart showing details of control between the spool file 303 generation process and a print data generation process (to be described later) in the spool file manager 304.

In step 601, the spool file manager 304 receives a print process progress message from the spooler 302 or despooler 305.

The spool file manager 304 checks in step 602 if the progress message is a print start message which is sent from the spooler 302 in step 504 described above. If YES in step 602, the flow advances to step 603, and the spool file manager 304 reads the print processing setups from the spool file 303 to start job management.

On the other hand, if it is determined in step 602 that the received progress message is not a print start message from the spooler 302, the flow advances to step 604, and the spool file manager 304 checks if the progress message is a print end message of one logical page which is sent from the spooler 302 in step 508 mentioned above. If the progress message is a print end message of one logical page, the flow advances to step 605 to store logical page information for that logical page.

It is then checked in step 606 if a print process of n logical pages that have been spooled at that time onto one physical page can start. If YES in step 606, the flow advances to step 607 to determine a physical page number on the basis of the number of logical pages assigned to one physical page to be printed.

As for a computation of a physical page, for example, when the processing setups lay out four logical pages on one physical page, the first physical page becomes ready for print when the fourth logical page has been spooled, thus determining the first physical page. Subsequently, the second physical page becomes ready for print when the eighth logical page has been spooled.

Also, even when the total number of logical pages is not a multiple of the number of logical pages to be laid out per physical page, logical pages to be laid out per physical page can be determined by a spool end message in step 512.

Figure 10:
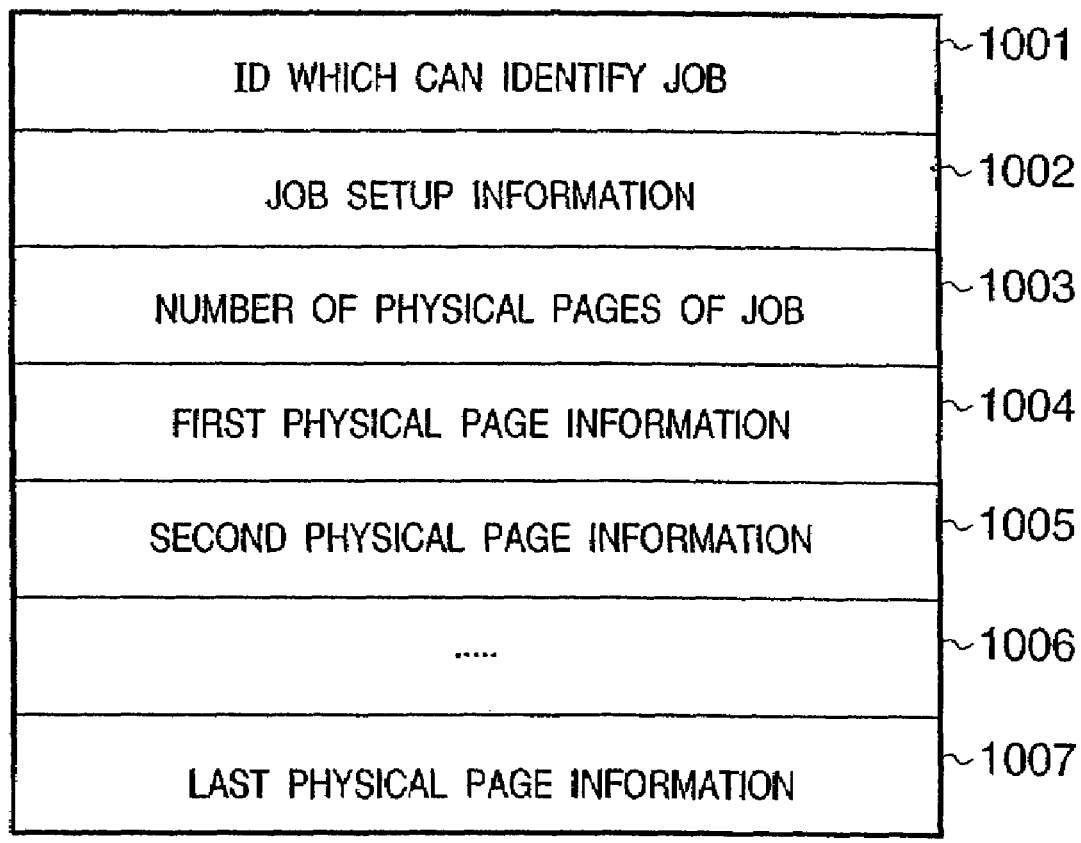
FIG. 10 shows an example of a data format to be passed when the spool file manager 304 issues a print request of a physical page to the despooler 305.

In step 608, the spool file manager 304 saves information such as the logical page numbers which form the physical page that is ready for print, the physical page number of that physical page, and the like in a job output setup file (a file including physical page information) in the format shown in FIG. 10, and informs the despooler 305 that physical page information for one physical page has been added. After that, the flow returns to step 601 to wait for the next message. In this embodiment, when print data for one page, i.e., logical pages that form one physical page have been spooled, a print process can start even when print jobs to be spooled still remain.

On the other hand, if it is determined in step 604 that the progress message is not a print end message of one logical page, the flow advances to step 609, and the spool file manager 304 checks if the progress message is a job end message sent from the spooler 302 in step 512 mentioned above. If YES in step 609, the flow advances to step 606 described above.

On the other hand, if the progress message is not a job end message, the flow advances to step 610, and the spool file manager 304 checks if the received message is a print end message of one physical page from the despooler 305. If the received message is a print end message of one physical page, the flow advances to step 611 to check if print processes for the processing setups are complete. If YES in step 611, the flow advances to step 612 to send a print end message to the despooler 305.

On the other hand, if it is determined that print processes for the processing setups are not complete yet, the flow advances to step 606 described above. The despooler 305 in this embodiment assumes one physical page as a unit for the print process. In step 608, information required for executing the print process of one physical page is saved in a file, so that such information can be used again. However, if such information need not be used again, a high-speed medium such as a shared memory or the like may be used to overwrite information in turn in units of physical pages, thus achieving both high processing speed and resource savings. On the other hand, when the progress of spooling is faster than that of despooling, or when despooling starts after completion of spooling of all pages, a message indicating that a plurality of physical pages or all physical pages are ready for print is sent in accordance with the progress on the despooling side in place of sending a page print ready message for each physical page in step 608, thus reducing the number of messages.

If it is determined in step 610 that the message is not a print end message of one physical page from the despooler, the flow advances to step 613, and the spool file manager 304 checks if the message is a print end message from the despooler 305. If it is determined that the message is a print end message from the despooler 305, the flow advances to step 614, and the spool file manager 304 deletes the corresponding page description files in the spool file 303, thus ending the processing. On the other hand, if the message is not a print end message from the despooler 305, the flow advances to step 615 to execute another normal process and to then wait for the next message.

<Output of Spool File>

Figure 7:
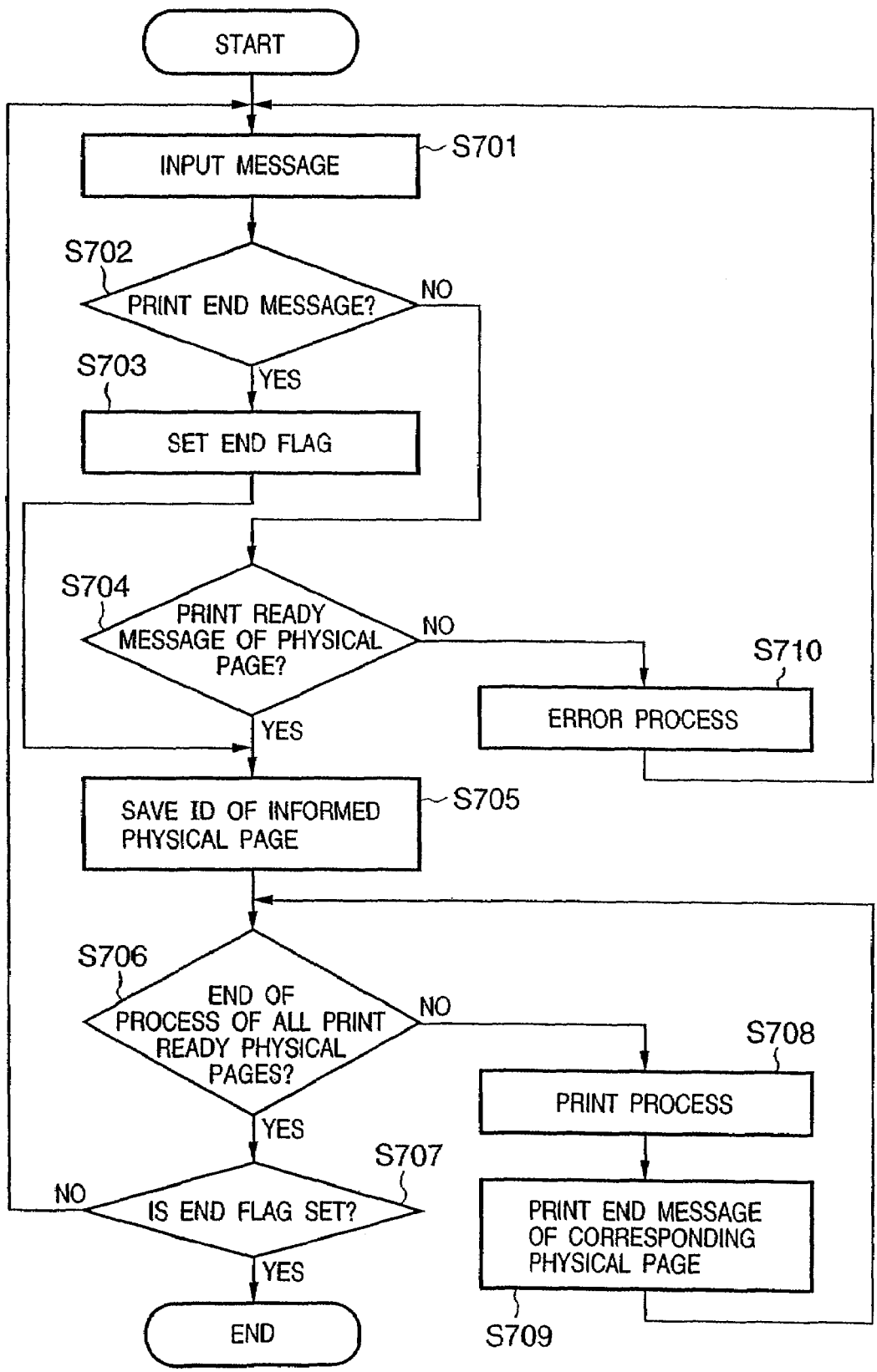
FIG. 7 is a flow chart showing the process in a despooler 305.

FIG. 7 is a flow chart showing details of the print data generation process in the despooler 305.

The despooler 305 reads out required information (page description file and job setup file) from the spool file 303 in response to the print request from the spool file manager 304, and generates print data. The method of transferring the generated print data to the printer has already been explained with reference to FIG. 3.

Upon generating print data, the despooler 305 receives a message from the spool file manager 304 in step 701. The despooler 305 checks in step 702 if the input message is a job end message. If YES in step 702, the flow advances to step 703 to set an end flag, and the flow then jumps to step 705.

On the other hand, if it is determined in step 702 that the received message is not a job end message, the flow advances to step 704 to check if the print start request of one physical page in step 608 mentioned above is received. If it is determined in step 704 that the received message is not a start request, the flow advances to step 710 to execute an error process, and the flow returns to step 701 to wait for the next message. On the other hand, if it is determined in step 704 that the received message is a print start request of one physical page, the flow advances to step 705, and the despooler 305 saves the IDs of physical pages, the print ready message of which was received in step 704.

The despooler 305 checks in step 706 if print processes of all pages of the physical page IDs saved in step 705 are complete. If YES in step 706, the flow advances to step 707 to check if the end flag was set in step 703 mentioned above. If YES in step 707, the despooler 305 determines that the job print process is complete, and sends its processing end message to the spool file manager 304, thus ending the processing.

If it is determined in step 707 that the end flag is not set, the flow returns to step 701 to wait for the next message. If it is determined in step 706 that physical pages which are ready for print still remain, the flow advances to step 708. In step 708, the despooler 305 reads out unprocessed physical page IDs in turn from the saved physical page IDs, reads information required for generating print data of a physical page corresponding to each readout physical page ID, and executes a print process. The print process is done by converting by the despooler 305 a print request command stored in the spool file 303 into a format (GDI function) that the graphic engine 202 can recognize, and transferring it to the printer driver.

As for the processing setups that lay out a plurality of logical pages on one physical page (to be referred to as an N-page print process hereinafter) as in this embodiment, conversion in this step is done in consideration of the layout upon reduction in scale. Upon completion of the required print process, the despooler 305 sends a print data generation end message of one physical page to the spool file manager 304 in step 709. The flow returns to step 706 to repeat the aforementioned processes until print processes for all the physical page IDs of print ready pages, which were saved in step 705, are complete.

The flow of the print process using the dispatcher 301, spooler 302, spool file manager 304, and despooler 305 has been explained. With the above process, since the application 201 is released from the print process at the timing at which the spooler 302 generates intermediate codes and stores them in the spool file 303, the application 201 can be released earlier than a case wherein a print command is directly output to the printer driver 203. Since intermediate files (page description file, job setup file) that consider the print setups of the printer driver are temporarily saved in the spool file 303, the user can recognize a print preview of an image to be actually printed, and can combine or sort print jobs generated by a plurality of applications. Also, the user can change print setups to execute a print process without launching the application again.

In the print process using the spooler 302, a job output setup file is generated when the despooler 305 issues a print request to the graphic engine, and is also generated when the preview process, job combine process, or the like is done. The job output setup file is equivalent to a job setup file in case of an independent job, and is generated based on a plurality of pieces of job setup information in case of a combined job. The job output setup file will be explained below.

<Configuration of Job Output Setup File>

FIG. 10 shows an example of the job output setup file that saves information which is generated by the spool file manager 304 in step 608, and forms a print ready physical page. A field 1001 holds an ID that identifies a job, and may be held in the form of the name of a file or shared memory which saves this information. A field 1002 stores job setup information. The job setup information includes information unique to each job, such as a structure required for starting a job print process with respect to the graphic engine 202, designation of an N-page print process, designation of additional rendering of a page frame or the like, the number of copies, finishing designation such as staple, and the like. The job setup information in the field 1002 saves a required number of information in correspondence with the functions for a job. A field 1003 stores the number of physical pages of a job, and indicates the number of pieces of physical page information in correspondence with the value stored therein. Since this embodiment informs the number of physical pages which are ready for print, this field may be omitted. Fields 1004 to 1007 store physical page information in correspondence with the value stored in the field 1003. The physical page information will be explained later using FIG. 12.

FIG. 11 shows an example of the job setup information in the field 1002 shown in FIG. 10. A field 1101 stores the total number of physical pages. A field 1102 stores the total number of logical pages. The fields 1101 and 1102 are used when the number of pages is printed as additional information in addition to print data. While a print process continues, these fields store tentative values, or the spool file manager 304 postpones generation of information of print ready physical pages until the print process ends. A field 1103 stores information indicating the number of copies to be printed of the print job of interest. A field 1104 stores information that designates if a print process is done in units of copy sets, when information set in the field 1103 indicates a print process of a plurality of sets of copies. A field 1105 stores finishing information such as staple, punch, Z-fold, and the like, which information is designated when a finisher is available on the printer main body or an external device. A field 1106 stores additional print information, which saves information to be added to a job such as decoration including a page frame or the like, additional information including a date or the like, the user name, the number of pages, watermark print, and the like. The number of fields included in this job setup information increases with increasing number of functions. For example, when a two-sided print function is available, a field for saving designation of two-sided print is added.

Figure 12:
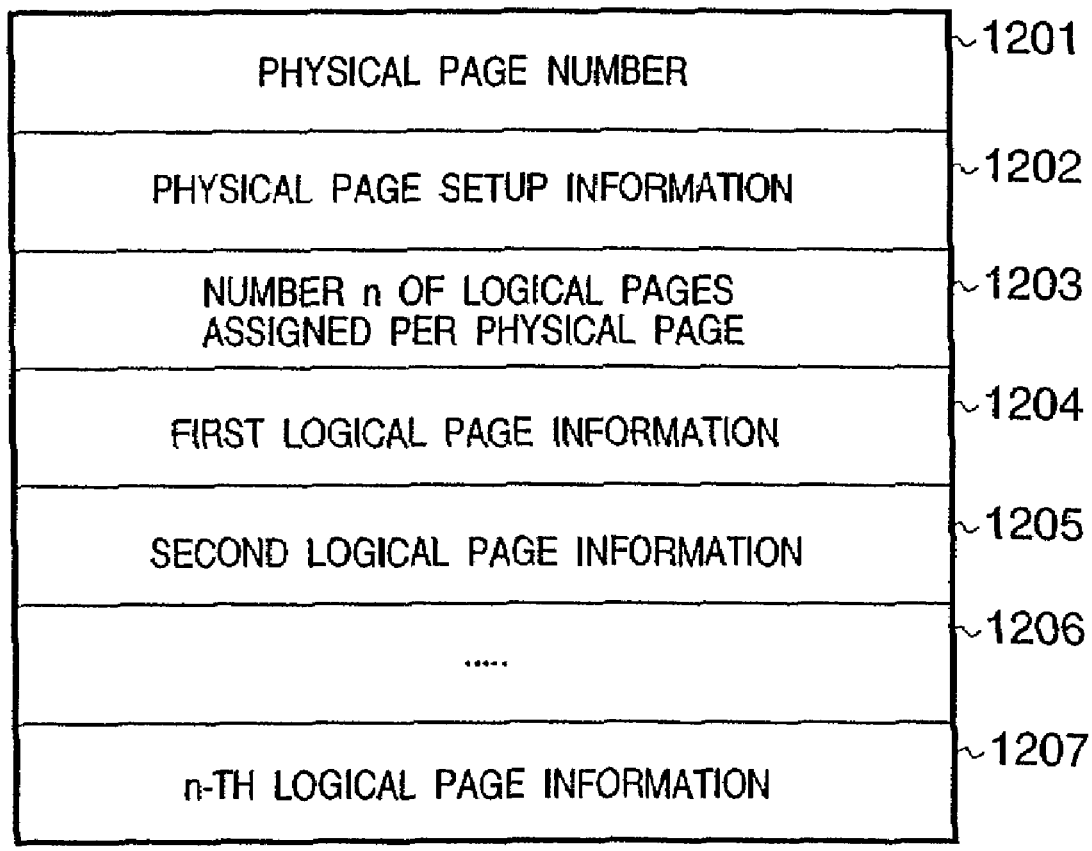
FIG. 12 shows an example of a data format to be passed when the spool file manager 304 issues a print request of a physical page to the despooler 305.

FIG. 12 shows an example of the physical page information in the field 1004 shown in FIG. 10. A first field 1201 stores a physical page number, which is a value used when the print order is managed or a physical page number is additionally printed. A field 1202 stores physical page setup information, which saves layout or color/monochrome setups when a layout or color/monochrome mode can be designated in units of Physical pages. A field 1203 stores the number of logical pages assigned to the physical page of interest, and saves a value "4" or an ID indicating 4-page print when four pages are assigned per physical page.

A field 1204 and the subsequent fields save information of logical pages in correspondence with the number designated in the field 1203. Depending on the number of pages printed from the application 201, the actual number of page data sometimes becomes smaller than the number of pages designated by the field 1203. In such case, logical page information saves special data indicating a blank page.

Figure 13:
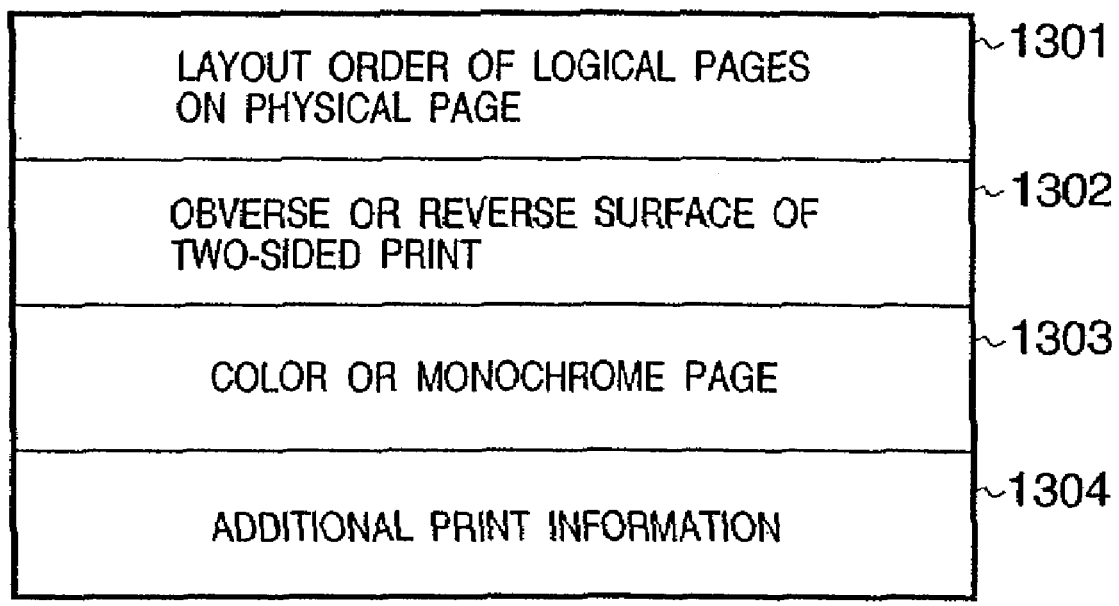
FIG. 13 shows an example of a data format to be passed when the spool file manager 304 issues a print request of a physical page to the despooler 305.

FIG. 13 shows an example of the physical page setup information in the field 1202. A field 1301 stores the layout order of logical pages on a physical page, and saves designation of the order that logical pages are laid out on a physical page (from upper left to right, from upper left to lower, and the like) in an N-page print process. In some systems, the field 1204 and the subsequent fields that store logical page information may be arranged not in a page number order but in the layout order in place of the setups in the field 1301.

A field 1302 stores information indicating the obverse or reverse surface of the two-sided print, which is used when, e.g., binding margins are to be formed on identical sides on the obverse and reverse surfaces. A field 1303 stores designation of a color or monochrome page, which is a value used when a printer has both monochrome and color modes, and color and monochrome pages of a document that includes both color and monochrome pages are to be printed in the color and monochrome modes, respectively. With this information, the color printer can change processes in units of pages as an auto color mode. That is, transfer control is done for a color page by completing rotations of an intermediate transfer member (intermediate transfer drum or belt) or transfer member (transfer drum or belt) in correspondence with the number of device colors (four rotations in case of YMCK), and for a monochrome page by completing one rotation for black.

A field 1304 stores additional print information, which is used when additional information such as the number of pages, date, or the like is printed on a physical page. In the physical setup information, the number of fields increases in correspondence with the number of functions of the system.

Figure 14:
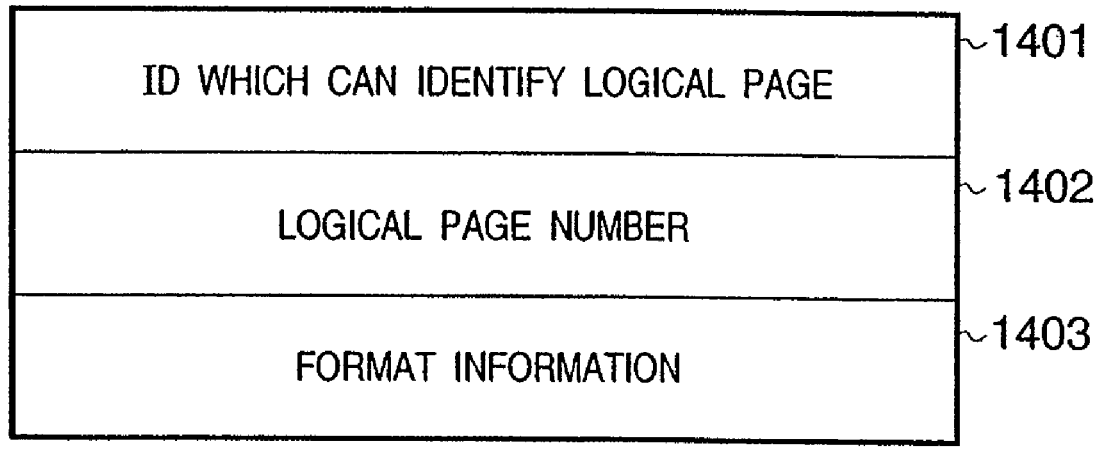
FIG. 14 shows an example of a data format to be passed when the spool file manager 304 issues a print request of a physical page to the despooler 305.

FIG. 14 shows an example of logical page information stored in the field 1204. A field 1401 stores the ID of a physical page. Using this ID, an intermediate code of a page description file corresponding to the logical page of interest is looked up from the spool file 303. This field may store a file or memory pointer, or an intermediate code itself that forms a logical page, as long as the intermediate code of a logical page can be accessed using this ID.

A field 1402 stores a logical page number, which is used when the logical page number is printed as additional information or as auxiliary information of the logical page ID. Format information in a field 1403 saves various setup items that can be designated in units of logical pages. For example, the format information saves additional print information such as a page frame and various kinds of setup information designated in units of logical pages such as an enlargement/reduction ratio and the like. Also, the format information can save attribute information of a logical page such as color/monochrome information in units of logical pages if necessary. Conversely, if a system need not switch setups in units of local pages or does not require any attribute information in units of logical pages, the field 1403 can be omitted.

The job output setup file has the aforementioned configuration. Note that the job setup file has nearly the same configuration. The job setup file saves a print method (one-sided, two-sided, bookbinding print), a print layout (N-up, poster print), additional information (addition of watermark, date, user name), the number of copies, and paper size information for each job. Also, the job setup file saves the layout order of logical pages, information indicating the obverse or reverse surface of two-sided print, color mode information, and the like in units of physical pages.

Furthermore, FIG. 3 shows the example in which the setup change editor 307 having a function of changing the setups of a job is added to the expanded system described so far. In this embodiment, the setup contents of an independent job are contained in a job setup file, and those of a combined job are contained in a job output setup file shown in FIG. 10. In addition, these files are independent from the page description file that saves intermediate codes. Hence, the setups of each job can be changed by editing the job output setup file. The setup change editor 307 edits or partially rewrites the job output setup file solely or in collaboration with the spool file manager 304, thus implementing the job setup change function.

<Processing Sequence of Setup Change>

Figure 15:
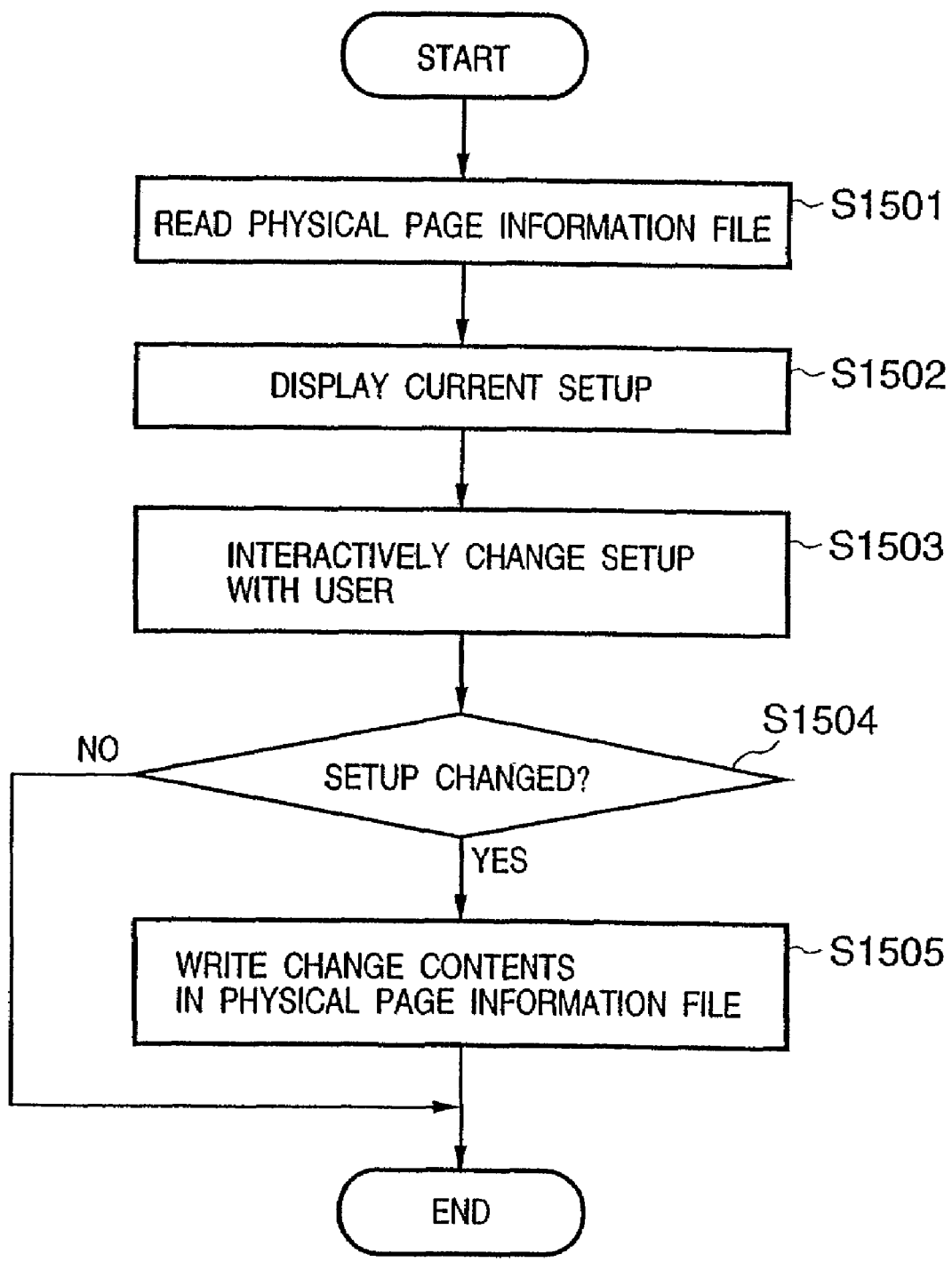
FIG. 15 is a flow chart showing a setup change process in a setup change editor 307.

FIG. 15 is a flow chart showing details of the job setup change process in the setup change editor 307.

In step 1501, the setup change editor reads a job setup file or job output setup file. The job output setup file is the same file as that read by the previewer 306 and despooler 305.

The flow advances to step 1502 to display the read result to the user. In step S1503, the setup change editor interactively changes the setup contents by the aforementioned menu designation and the like with the user on the user interface shown in FIG. 18. This step may be attained in a batch manner that changes contents in accordance with setup change contents written in a file or the like in place of the interactive manner.

The flow advances to step 1504, and the setup change editor compares the initially read contents and the currently designated setup contents to check if the contents have been changed. If the setup contents have been changed, the flow advances to step 1505 to generate a new job output setup file and inform the spool manager file of the changes, thus ending the processing. If it is determined in step 1504 that the setup changes are not changed, the setup change editor informs the spool file manager of that fact, thus ending the processing.

A new job output setup file is generated in this way. When an "OK" button 1801 is selected on the user interface window in FIG. 18, the new job output setup file is enabled, and the old job output setup file is deleted. When the job setup file of an independent job has been changed in place of the job output setup file, the old file is saved without being deleted. When a "restore defaults" button 1802 is selected on the window shown in FIG. 18, the new job output setup file is deleted, and the old job output setup file is enabled and reflected in display.

This embodiment has explained the setup change editor 307 as an independent module. Alternatively, the setup change editor 307 may be a part of the user interface of the spool file manager 304. Also, the setup change editor 307 may be implemented as follows. That is, the editor 307 does not actually write change contents in the job output setup file and informs the spool file manager 304 of only the setup change contents, and the spool file manager 304 actually changes the job output setup file.

FIG. 3 shows the expanded system that combines a plurality of print jobs and prints them as a single print job. An expansion for despooling and previewing a combined job will be explained below.

Normally, spool files 303 with the intermediate format are generated in units of jobs. In case of an independent job, since a print process, setup change process, or the like is executed by sequentially reading out intermediate codes of respective logical pages in the job file to be processed, the logical page ID in the field 1401 can be implemented by a relative or absolute offset which indicates the location of each logical page in a file. In case of a combined job, a spool file and page information which belongs to that job must be specified from the job ID in the field 1401. In this embodiment, a spool file is specified by appending an ID that identifies a spool file to the logical page ID. In this case, only the field 1401 can be modified. If the spool file can be identified, read of page information can be processed by the same logic as in the process of an independent job. In another implementation, when spool files are saved as independent files in units of logical pages, the file name of each logical page may be used as the logical page ID in the field 1401.

<Preview Display in Store Process>

The sequence for displaying a print preview image on the basis of a print job saved as intermediate data and a job output setup file will be explained below. When the user designates a store process of a print job from a menu 901, as shown in FIG. 9, in the print process from the application program, a print job defined by intermediate codes and a job output setup file can be generated in the sequence shown in FIG. 5. As a result, a list of currently stored print jobs is displayed, as shown in FIG. 16. The user designates a desired print job from the print job list, and can edit the print job, combine jobs, add the print job to the already combined print job, change the order of print jobs in the combined job, and so forth.

In this case, when the user designates a given print job from the list and designates an operation such as edit, combine, or the like from the button or menu, a print preview window of the entire designated job is displayed, as shown in FIG. 18. Note that this print preview window can also display a preview image of the page relationship in the entire independent or combined print job unlike a normal preview window prepared by an application, which displays a preview image for each page.

Figure 19:
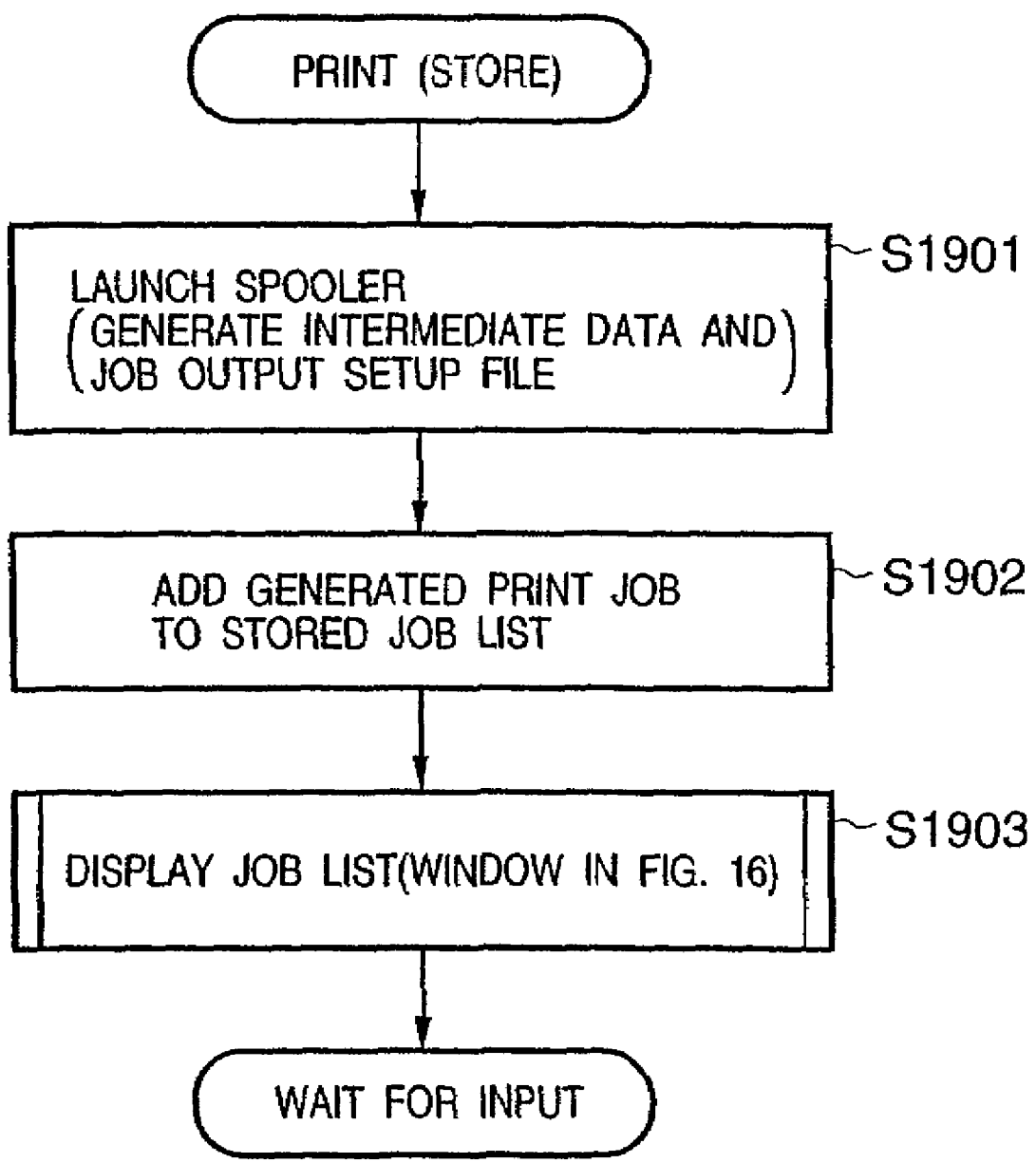
FIG. 19 is a flow chart showing the process when data created by an application program or the like is printed with store designation.

FIG. 19 shows the sequence when data created by an application program or the like undergoes a print process while designating a store process. When the user selects "store" from the menu 901 as the output destination on the window shown in FIG. 9, and starts the print process, the sequence shown in FIG. 9 is executed.

In step S1901, the spooler is launched to generate and store intermediate data and a job output setup file. When "store" is designated, the spooler does not issue any print start instruction to the spool manager, and the intermediate data are held without being printed. The print job in this state is called a stored print job in this embodiment.

The print job that has been converted into and held as intermediate data in step S1901 is added to the already stored print job list in step S1902. In this embodiment, the stored print job is held only during execution of a program (the previewer 306 and setup change editor 307 in FIG. 3) for managing stored print jobs, and is deleted upon quitting such program. However, the stored print job may be held until it is actually deleted.

When a new print job is added to the stored print job list, a list of these jobs is displayed in step S1903, as shown in FIG. 16. Note that a print job held as intermediate data is called a held job, and a job selected for the combine or edit process is called a target job.

<Display of Job List>

Figure 20:
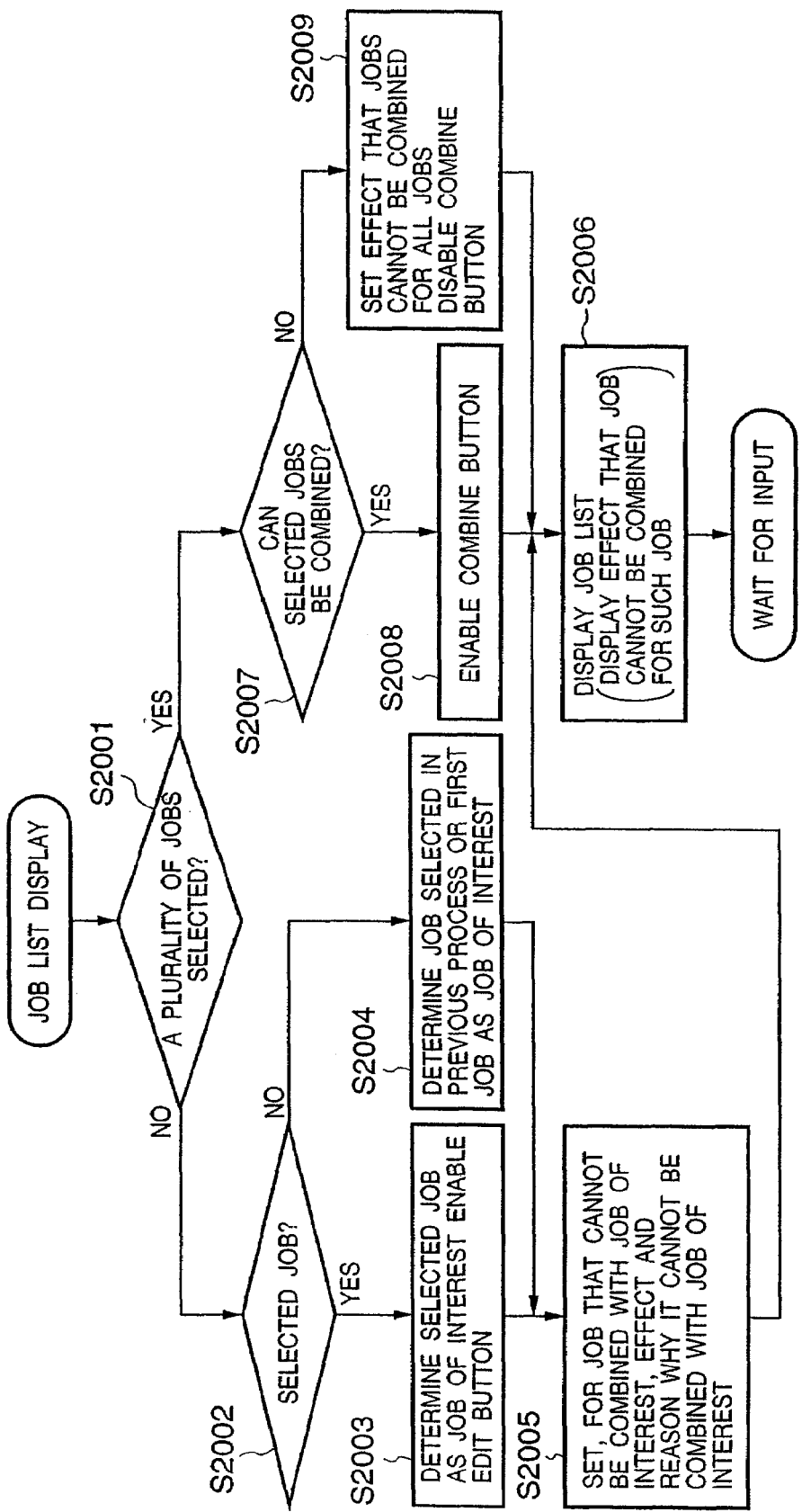
FIG. 20 is a flow chart showing details of step S1903 in FIG. 19.

FIG. 20 is a flow chart showing details of step S1903 in FIG. 19. Note that the sequence in FIG. 20 is executed every time the state to be displayed has been changed, e.g., when a job is selected from the job list, thus updating the displayed job list.

It is checked in step S2001 if a plurality of jobs are selected. If NO in step S2001, it is checked in step S2002 if a job is selected. If YES in step S2002, that job is determined as a job of interest, and an edit button is enabled. The edit button is a button 1608 in FIG. 16. FIG. 16 shows a state immediately after a single job is selected, and the edit button is enabled.

On the other hand, if no job is selected, a job which was selected in the previous process is determined as a job of interest in step S2004. If no such job is available, i.e., if the job list is displayed for the first time, the first job in the job list is determined as a job of interest.

After the job of interest is determined, a job which cannot be combined with the job of interest is picked up from the held jobs, and the effect and reason why the job cannot be combined with the job of interest are written in a predetermined memory area or the like (step S2005). Note that at least one of setup item values, which cannot be changed after a job is generated (e.g., the designated resolution, the number of bits per pixel, graphic mode, or the like), of the job that cannot be combined with the job of interest is different from that of the job of interest.

Figure 26:
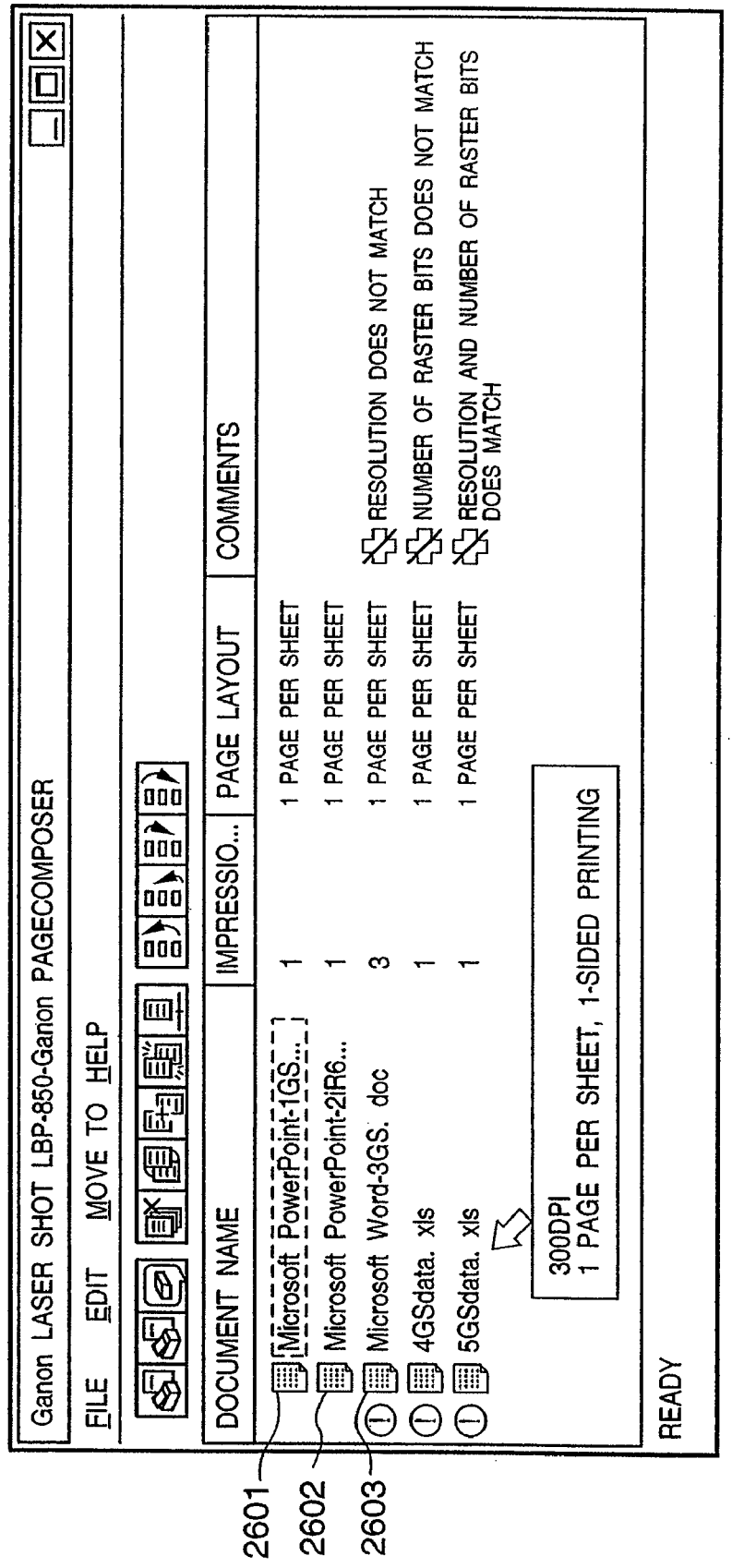
FIG. 26 shows a display example of a job list.

Finally, the job list is displayed in step S2006. In this case, as for the job for which the effect and reason why it cannot be combined with the job of interest are set in step S2005, a symbol indicating that this job cannot be combined with the job of interest and a reason therefor are displayed in the column where that job is displayed. FIG. 26 shows this state. Since a job 2602 can be combined with a selected job 2601, but a job 2603 and subsequent jobs cannot be combined, symbols indicating that message are displayed on the left side of document names, and reasons why these jobs cannot be combined are displayed in a comment field.

On the other hand, if a plurality of jobs are selected, it is checked in step S2007 if the selected jobs can be combined. If YES in step S2007, a combine button (a button 1606 in FIG. 16) is enabled (selectable) in step S2008, and the flow advances to step S2006 to display the job list.

If all the selected jobs cannot be combined, a message indicating that all the held jobs cannot be combined is set in step S2009. In step S2006, symbols and comments are displayed for the jobs for which the message indicating that they cannot be combined is set in step S2009.

In this way, the job list is displayed. As described above, since the sequence in FIG. 20 is executed every time a job is selected from the job list, jobs that can be combined with the selected job, and possibility of the edit or combine operation for the selected job can be presented to the user.

<Edit/Combine Operation>

Figure 21:
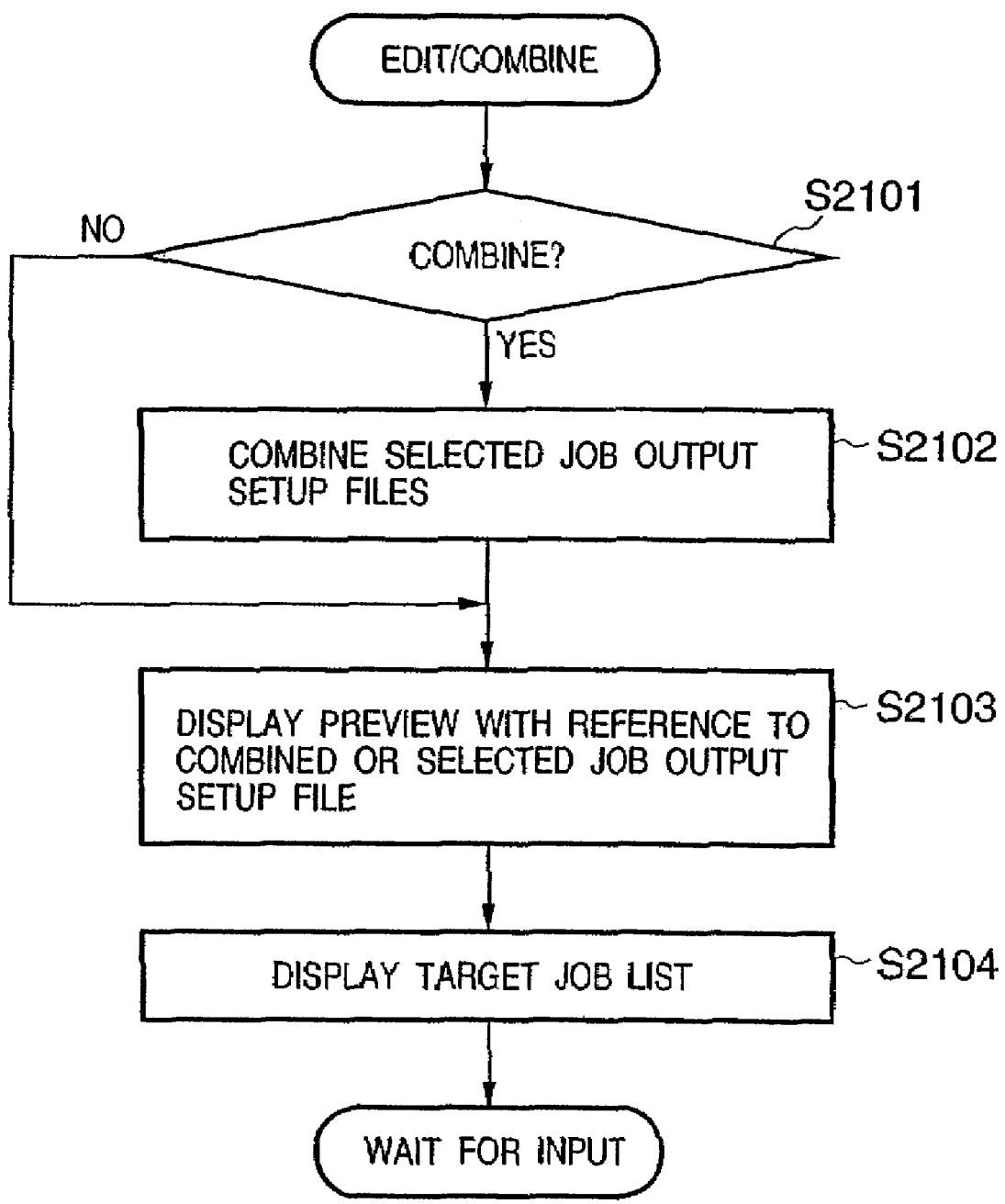
FIG. 21 is a flow chart showing the processing sequence upon operation of an edit button or combine button while a job is selected from a job list.

When the edit button (for a case wherein only one job is selected) or the combine button (for a case wherein a plurality of jobs are selected) is pressed while a job or jobs are selected from the display job list, the sequence shown in FIG. 21 is executed. When jobs which cannot be combined are selected, no combine operation is available.

It is checked in step S2101 if the combine operation is made. If YES in step S2101, selected job output setup files are tentatively combined in step S2102. Since this operation is not settled, a tentative job output file is generated and used. Upon combining jobs, some setup values are changed to common values in place of the individual setups of the jobs.

As the method of setting common setups, the setup values may be changed to predetermined ones, or the setups of jobs other than the first job are set or cleared in correspondence with those of the first job. For example, the print methods of jobs to be combined are commonly set to be one-sided print unless they are all designated with two-sided print. Also, the setup values of the binding margin, staple designation, ascending/descending print order, face-up/down print, use of an inserter, and the like are set in correspondence with those of the first job. In addition, the setup values of the number of copies, bookbinding designation, and the like are cleared.

Preview display is executed using the job output setup file combined in step S2102 or that of a job selected as a job to be edited in step S2103, and a target job list is displayed in step S2104. The preview window displays thumbnail images of all pages contained in jobs to be edited or combined in accordance with their layouts. On the other hand, the target job list displays the names, number of pages, and page layouts of jobs to be edited or combined. In this list display, in case of the combine operation, the job order can be sorted desirably, and a desired job can be deleted from the target jobs. When the target job is operated in this manner, the sequence shown in FIG. 21 is executed again, and the preview window and target job list are re-displayed.

Also, the print setups of the target job can be changed. Items that can be changed are those which can be changed by editing the job output setup file. Items that require operations of intermediate data are inhibited from being operated in this embodiment. However, all items may be re-set regardless of the processing time or resources required. Items that can be re-set in the system of this embodiment are the print method (one-sided/two-sided/bookbinding), the number of copies, the presence/absence of staple, and the like.

<Print Preview Display of Target Job>

Figure 22:
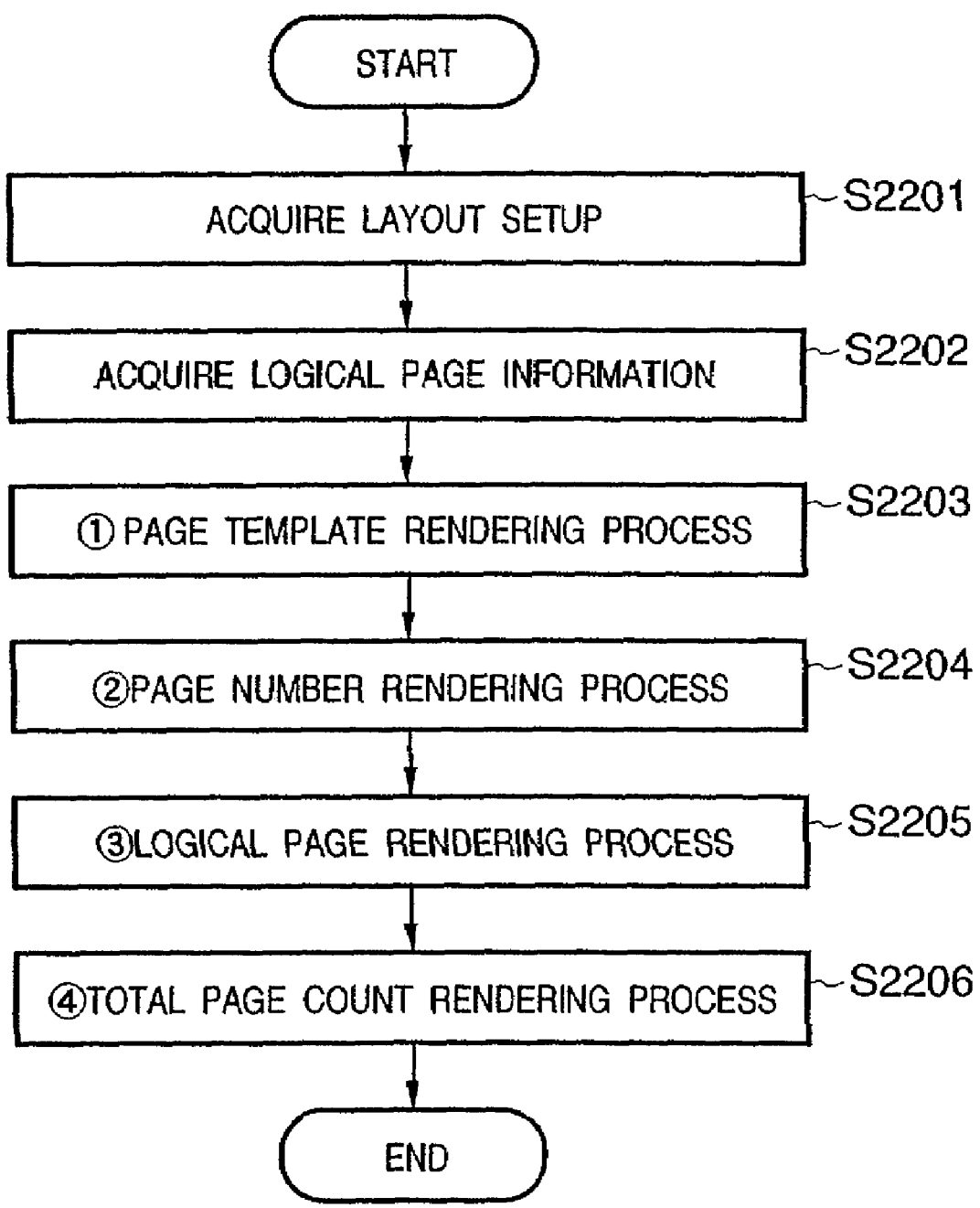
FIG. 22 is a flow chart showing the sequence for displaying a preview window upon operation of an edit button or combine button while a job is selected from a job list.

FIG. 22 is a flow chart showing the sequence for displaying the job preview window shown in FIG. 18 when the user instructs desired operation such as job edit, combine, or the like on the list display window of print jobs shown in FIG. 16, and shows details of step S2103 in FIG. 21.

Referring to FIG. 22, the layout setups of target jobs are acquired in step S2201. The layout setup items include the print method, page layout, page frame, finishing, paper feed switching, and the like, and these pieces of information are acquired from the job output setup file shown in FIGS. 10 to 13.

The layout setup items will be briefly explained below. Examples of items to be set are as follows.

(1) Print method: One of one-sided/two-sided/bookbinding is designated. The one- and two-sided print processes are well known. The bookbinding print process is a method of printing data to obtain the format of a book by only folding printed sheets once and binding them. When the bookbinding print mode is designated, one of a method of folding a set of copies once, and a method of designating a predetermined number of sheets, folding each predetermined number of sheets once, and then stacking and binding them can be designated. Such twofold unit is called a bookbinding unit.

In the bookbinding print process, since a stack of a designated number of sheets, e.g., two output sheets are bound by being folded once, data cannot be printed in the order of logical pages created by the application. The output order of logical pages, i.e., the layout order of logical pages on physical pages, is determined in advance so that logical pages are allocated in turn by turning pages of the bound sheets from the right to left (this direction is designated separately). Also, the order of logical pages differs depending on whether sheets are exhausted facing up or down.

Since the bookbinding print process corresponds to a two-sided 2-up print process in consideration of only the format regardless of the order of pages, four logical pages are printed on the obverse and reverse surfaces of a single sheet. Hence, the required number S of sheets is given by S=the number of logical pages/4 (with raising decimals to the next whole number). For example, when the exhaust method is face-up, and the bookbinding unit is S sheets, the $(4\times(P-1)+2\times Q-1)$-th logical page and $(4\times(P-1)+4\times S-2\times(Q-1))$-th logical page are laid out on the obverse surface (the surface printed first) of the Q-th sheet of the P-th bookbinding unit, and the $(4\times(P-1)+2\times Q)$-th logical page and $(4\times(P-1)+4\times S-2\times Q-1)$-th logical pages are laid out on the reverse surface thereof. In case of the face-down exhaust method, the reverse surface can replace the obverse surface.

(2) Book Opening Direction: This item indicates a direction to turn pages, and one of top open, right open, and left open can be designated.

(3) Bookbinding Unit: As described above, this item indicates a twofold unit in the bookbinding print process.

(4) Page Layout: One of a layout, so-called N-up print, that lays out N logical pages on one surface of a sheet (one physical page), and a layout, so-called poster print, that prints one logical page while dividing it onto a plurality of sheets can be designated.

(5) Finishing: This item can designate a process after the print process. For example, an external apparatus called an inserter can insert a sheet supplied independently of printed sheets as a cover page.

(6) Paper Source Switching: This item designates the way sheets are fed. For example, when middle insert is designated, sheets fed from one of feed ports undergo a print process, and sheets fed from the other feed port are inserted and exhausted between neighboring printed sheets. That is, sheets are alternately fed from the two feed ports.

The items that can be designated as layout setups have been explained.

In step S2202, the logical page information is acquired. The logical page is a page in data created by the application program or the like. When the Nup print process is designated, a plurality of logical pages are printed on one physical page, i.e., on one surface of one sheet. This logical page information is as shown in FIG. 14.

In step S2203, a page template is rendered on the basis of the information acquired in steps S2201 and S2202. The page template is a framework of each physical page in accordance with the designated layout, and is rendered in correspondence with the designated paper size and layout setups such as designation of one-sided/two-sided/bookbinding, portrait/landscape, and the like. However, when the poster print process is designated, since the combined state of images is displayed as a preview image, the above process is not applied.

In step S2204, a page number given to each page to be displayed as a preview image is rendered. In this case, pages are given in the order of logical or physical pages in accordance with the layout. In this way, the user can confirm accurate page numbers corresponding to the layout on the print preview window.

In step S2205, logical pages are rendered in correspondence with each page template. In this case, the job output setup file shown in FIGS. 10 to 14 is looked up, and logical pages are rendered on a single physical page in accordance with the setups registered in the job output setup file. Intermediate data of the logical pages to be rendered are acquired with reference to the logical page information shown in FIG. 14.

Finally, in step S2206, the total number of pages or the required number of sheets is rendered. The total number of pages amounts to the number of logical pages, and the required number of sheets is the number of paper sheets to be output.

(Page Template Rendering)

Figure 23:
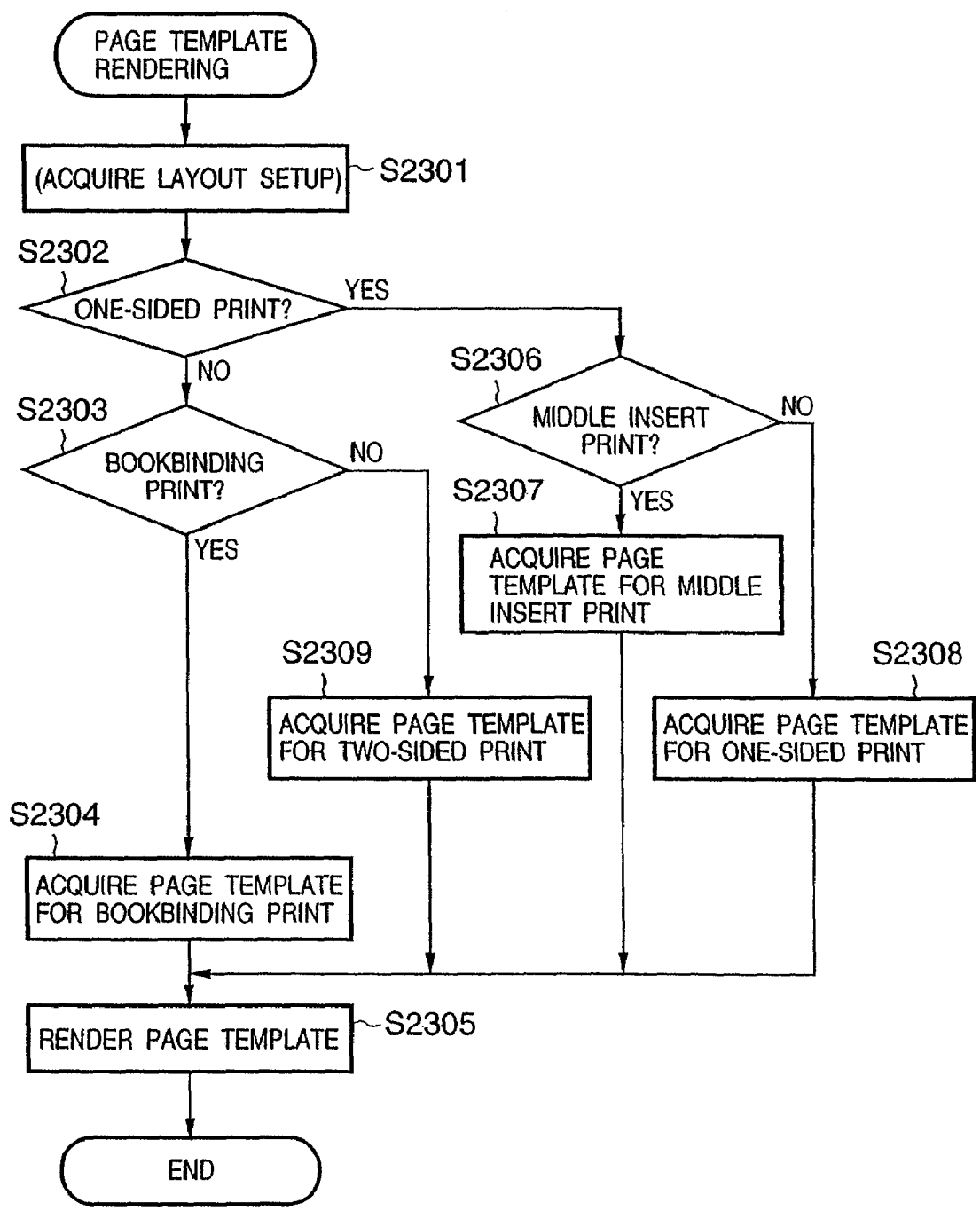
FIG. 23 is a flow chart showing details of step S2203 in FIG. 22.

FIG. 23 is a flow chart showing details of step S2203 in FIG. 22. The layout setups are acquired in step S2301 (enclosed in parentheses since the layout has already been acquired in step S2201 in FIG. 22), and the print method is checked in steps S2302 and S2303. If the bookbinding print process is selected, a page template for bookbinding print is acquired in step S2304; if the two-sided print process is selected, a page template for two-sided print is acquired in step S2309.

If the one-sided print process is selected, it is checked in step S2306 if the middle insert print process is selected. The middle insert print process is a print method for inserting and exhausting independently fed paper sheets between neighboring output printed sheets, and is used when transparent documents for an overhead projector are printed. If the middle insert print process is selected, a page template for middle insert print is acquired in step S2207; otherwise, a page template for one-sided print is acquired in step S2308.

Lastly, in step S2305 the page template is rendered in accordance with the acquired page template data.

(Page Number Rendering)

Figure 24:
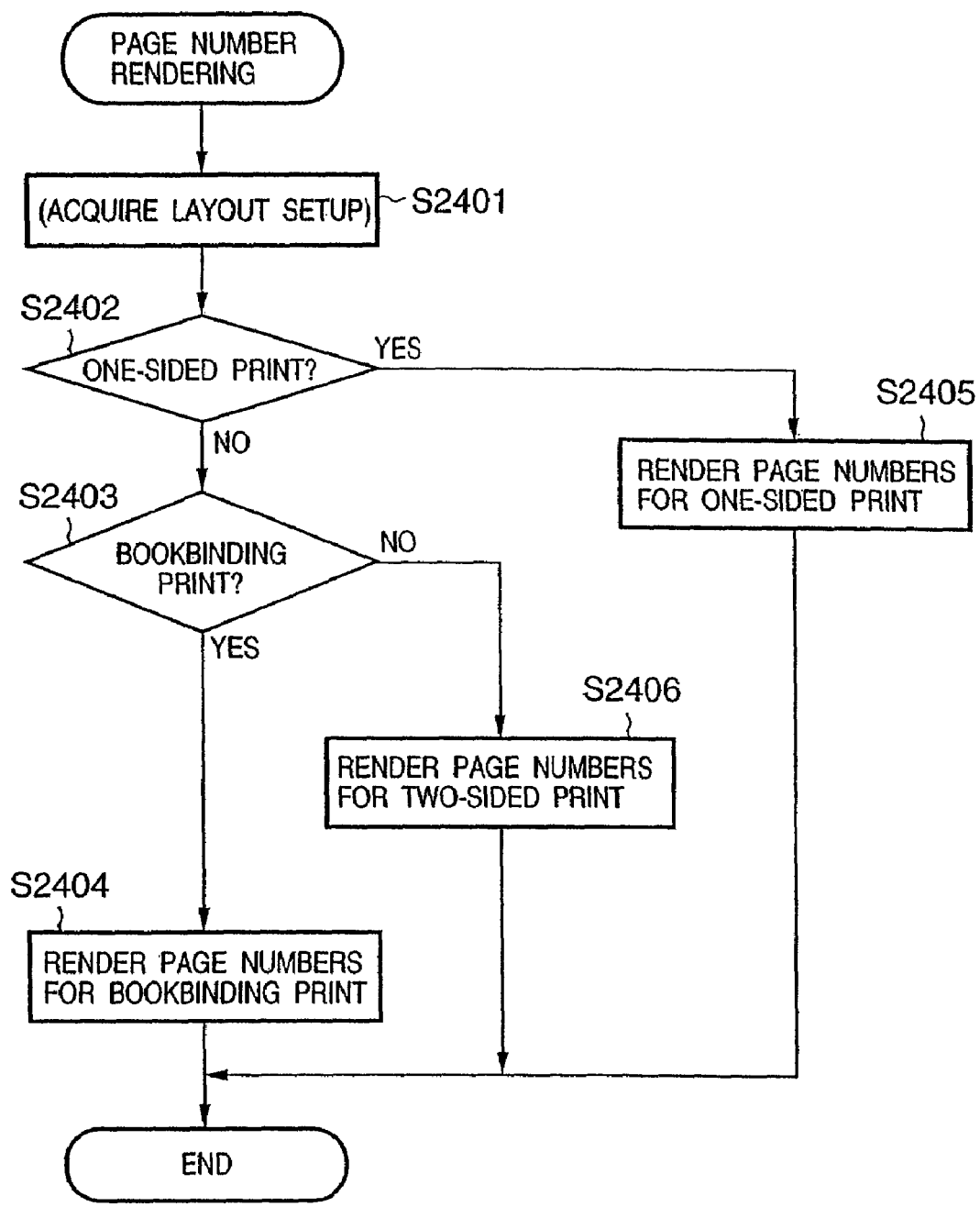
FIG. 24 is a flow chart showing details of step S2204 in FIG. 22.

FIG. 24 is a flow chart showing details of step S2204 in FIG. 22. The layout setups are acquired in step S2401 (enclosed in parentheses since the layout has already been acquired in step S2201 in FIG. 22), and the print method is checked in steps S2402 and S2403. If the bookbinding print process is selected, page numbers for bookbinding print are rendered in step S2404; if the two-sided print process is selected, page numbers for two-sided print are printed in step S2406. On the other hand, if the one-sided print process is selected, page numbers for one-sided print are rendered in step S2405.

(Logical Page Rendering)

Figure 25:
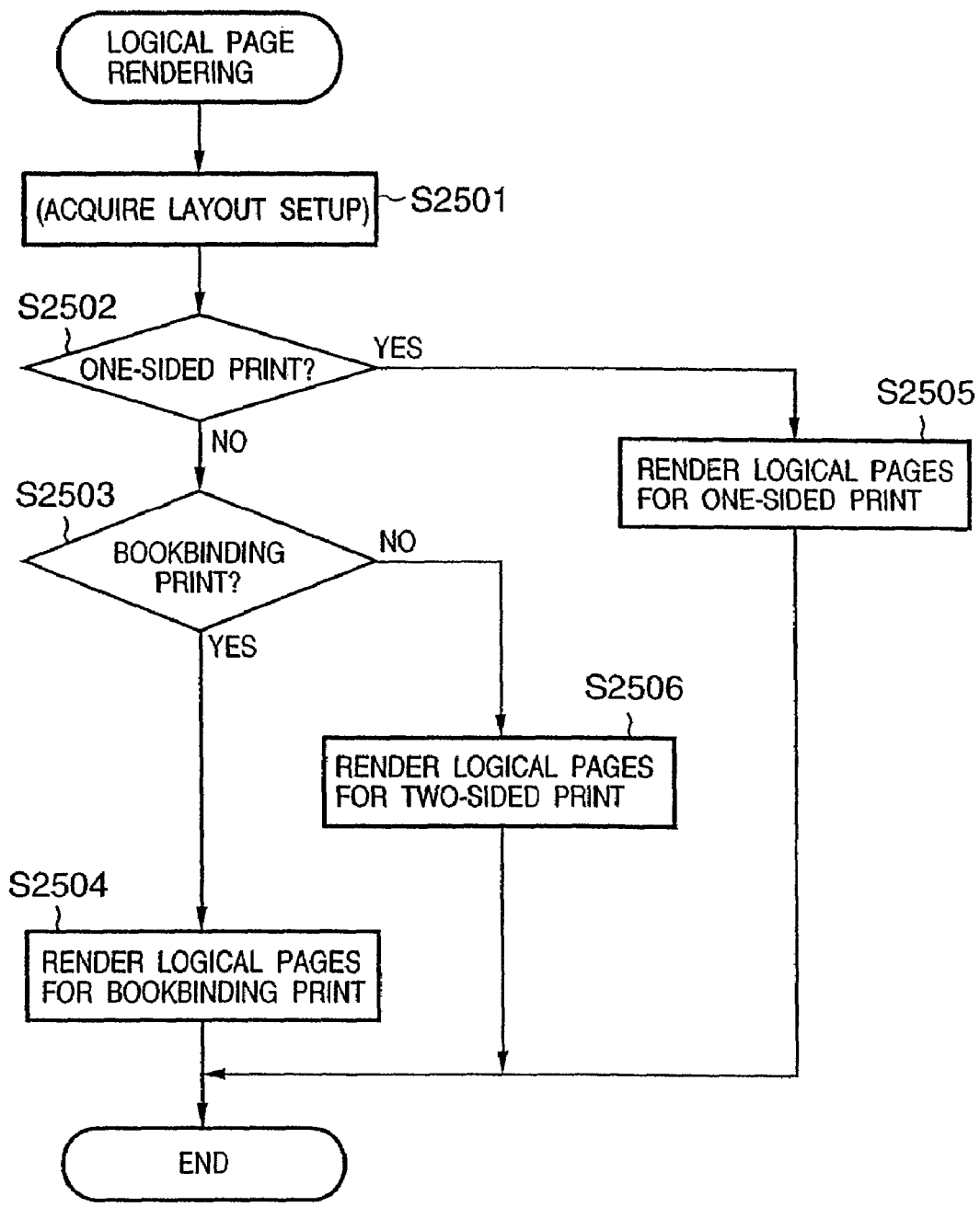
FIG. 25 is a flow chart showing details of step S2205 in FIG. 22.

FIG. 25 is a flow chart showing details of step S2205 in FIG. 22. The layout setups are acquired in step S2501 (enclosed in parentheses since the layout has already been acquired in step S2201 in FIG. 22), and the print method is checked in steps S2502 and S2503. If the bookbinding print process is selected, logical pages for bookbinding print are rendered in step S2504; if the two-sided print process is selected, logical pages for two-sided print are printed in step S2506. On the other hand, if the one-sided print process is selected, logical pages for one-sided print are rendered in step S2505. Since logical pages are rendered in accordance with the job output setup file and logical page information, a process that does not classify according to the print method may be done.

<Details of Preview Display>

As described above, a print preview window is displayed in accordance with designation of the layout. Details of preview display will be explained below.

(Preview Upon Designating Middle Insertion)

Figure 37:
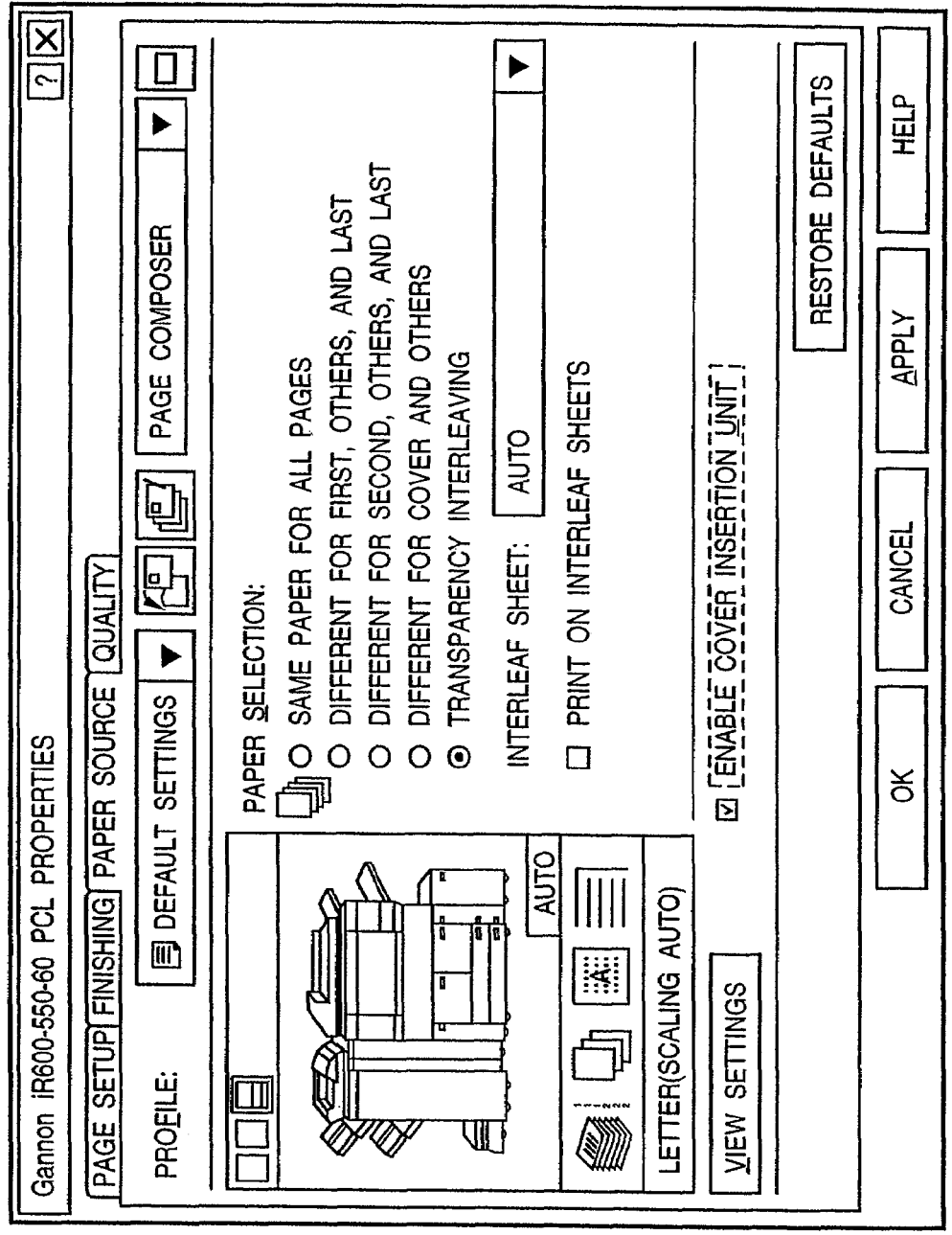
FIG. 37 shows an example of a window for designating middle insertion.

When a one-sided print method is designated, a printing apparatus which comprises a plurality of paper feed ports allows designation of middle insertion. FIG. 37 shows an example of the window for designating middle insertion. In FIG. 37, a check block "Enable Cover Insertion Unit" is checked, thus setting a middle insertion flag or the like, and middle insertion is executed with reference to this flag in the print process and print preview process.

Figure 38:
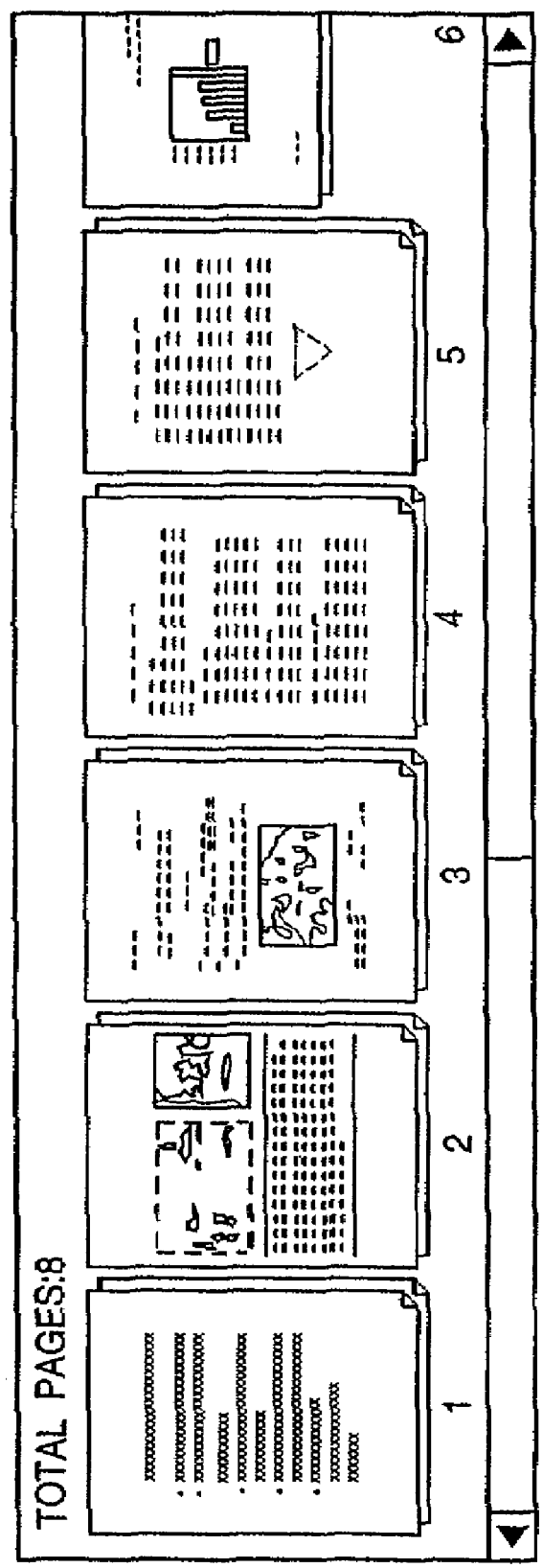
FIG. 38 shows an example of a page template for middle insertion.

Upon rendering a page template, a page template for middle insertion is acquired in step S2307 in FIG. 23. FIG. 38 shows an example of this template. In this way, when middle insertion is designated, a page template indicating a stack of two pages is displayed, and a logical page is rendered above the page template.

In this manner, whether or not middle insertion is designated and the middle insertion result can be confirmed even on the preview window. When an image of a middle-inserted page is pointed by a pointer, a character string indicating that the image corresponds to a middle-inserted page, e.g., "middle-inserted page" is displayed (not shown), as in FIG. 35.

<Preview Display in Bookbinding Print>

Details of preview display upon designating a bookbinding print method will be explained below.

Figure 27:
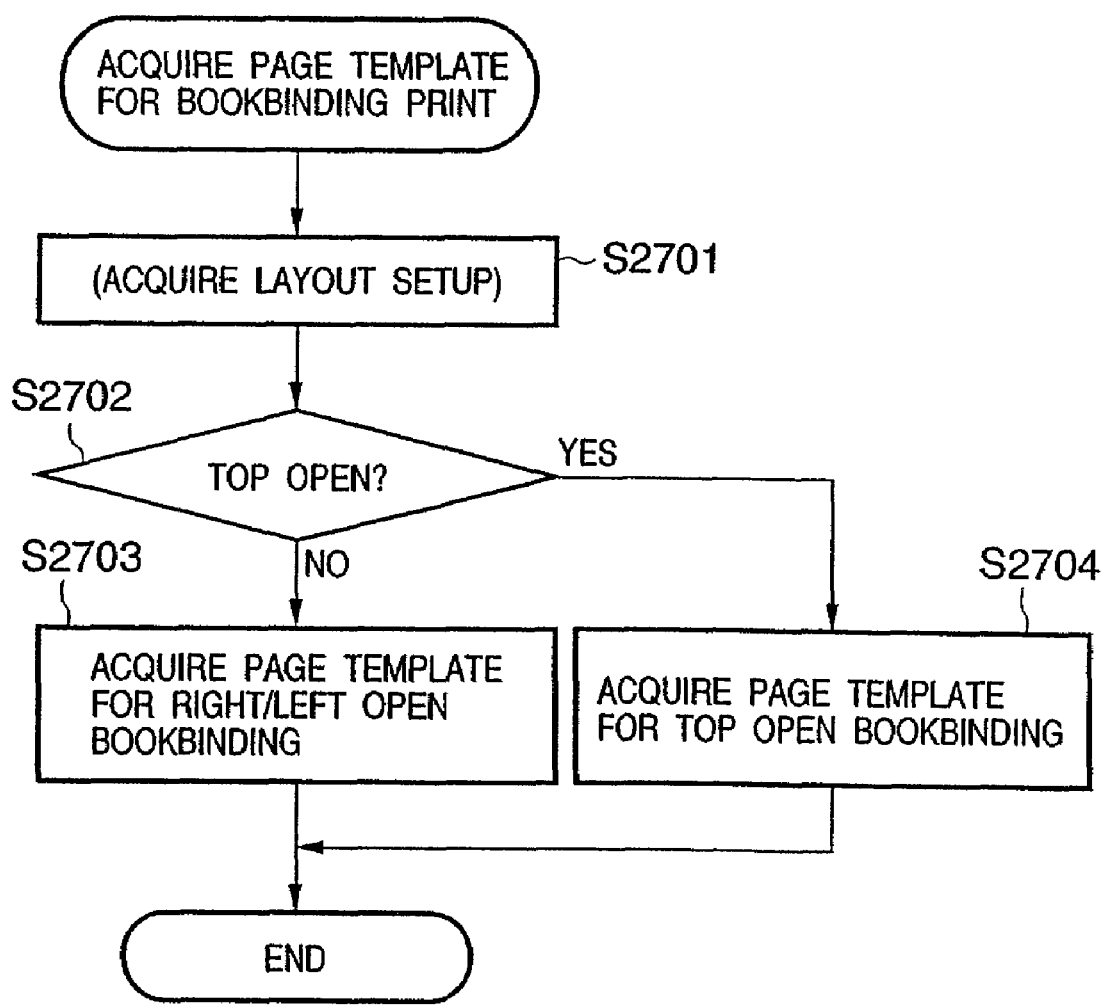
FIG. 27 is a flow chart showing the page template acquisition sequence in the bookbinding print process.
Figure 28:
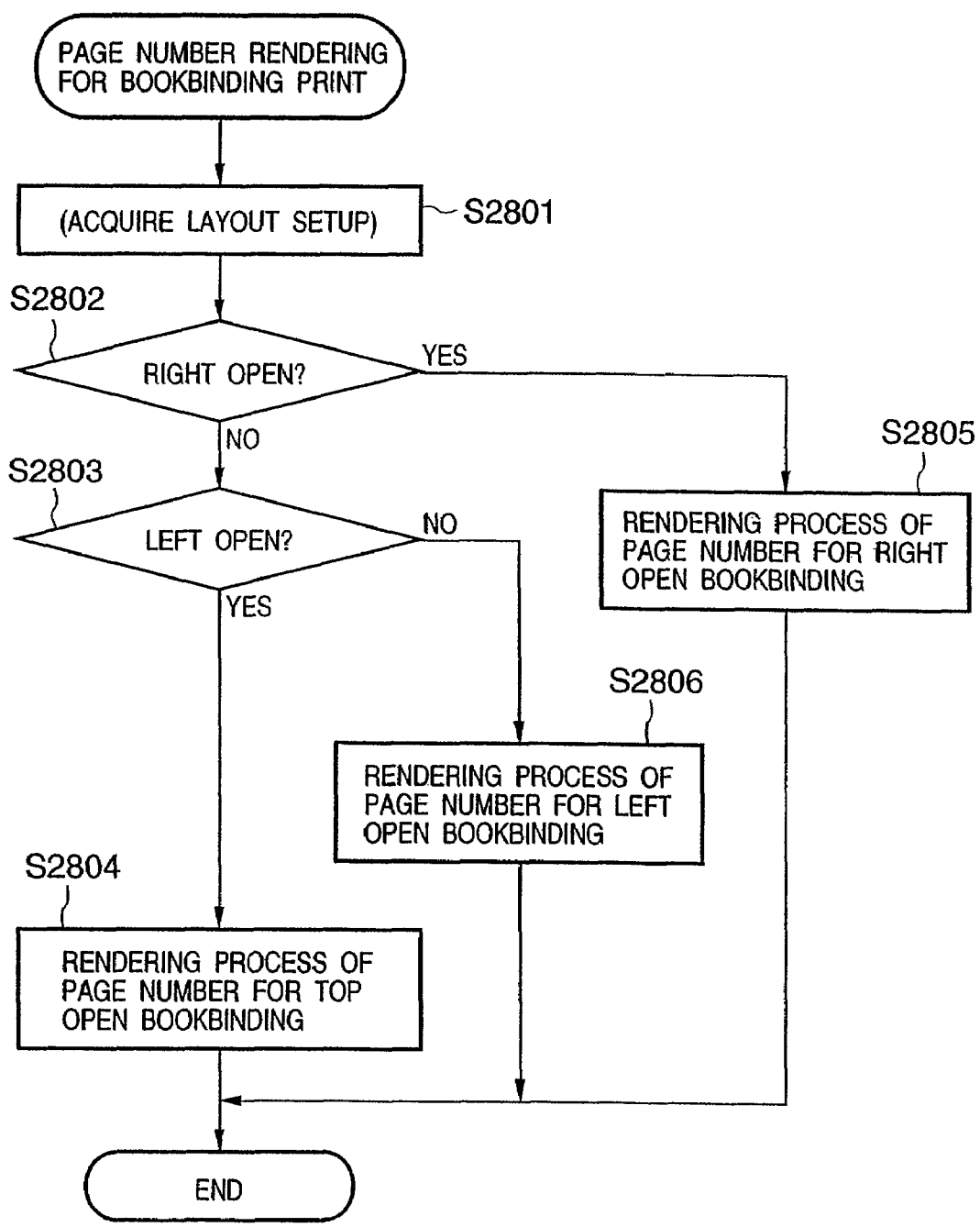
FIG. 28 is a flow chart showing the page number rendering sequence in the bookbinding print process.
Figure 29:
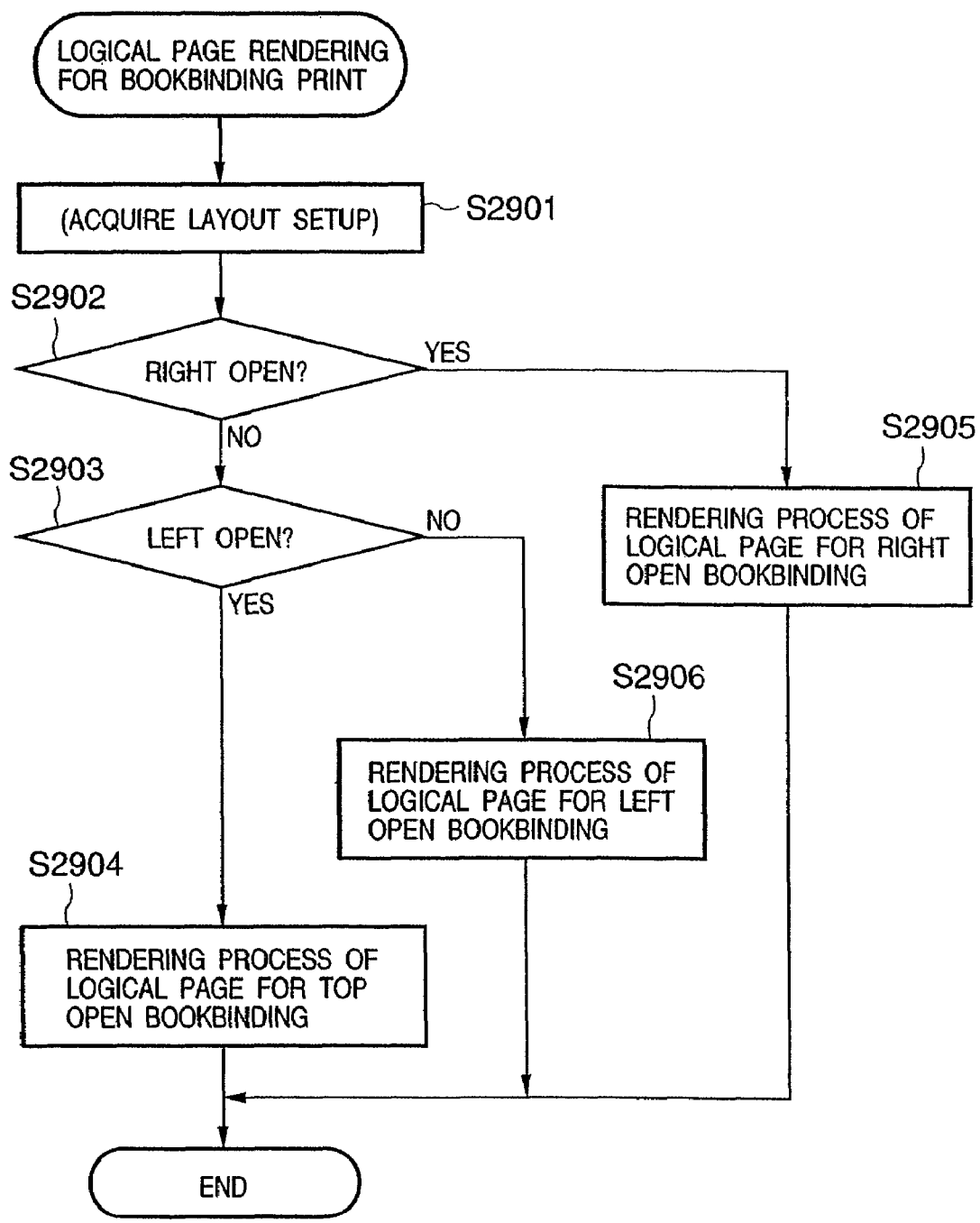
FIG. 29 is a flow chart showing the logical page rendering sequence in the bookbinding print process.

FIGS. 27, 28, and 29 are flow charts respectively showing the page template acquisition, page number rendering, and logical page rendering sequences. These flow charts respectively correspond to step S2304 in FIG. 23, step S2404 in FIG. 24, and step S2504 in FIG. 25.

(Acquire Page Template for Bookbinding Print)

Figure 34A:
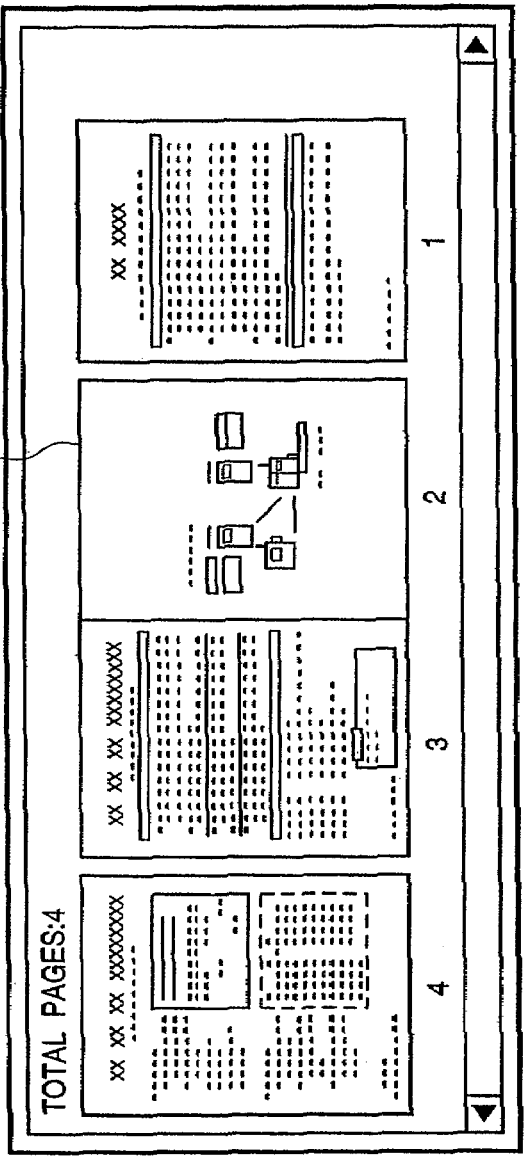
FIG. 34A shows an example of a preview window in case of right open.
Figure 34B:
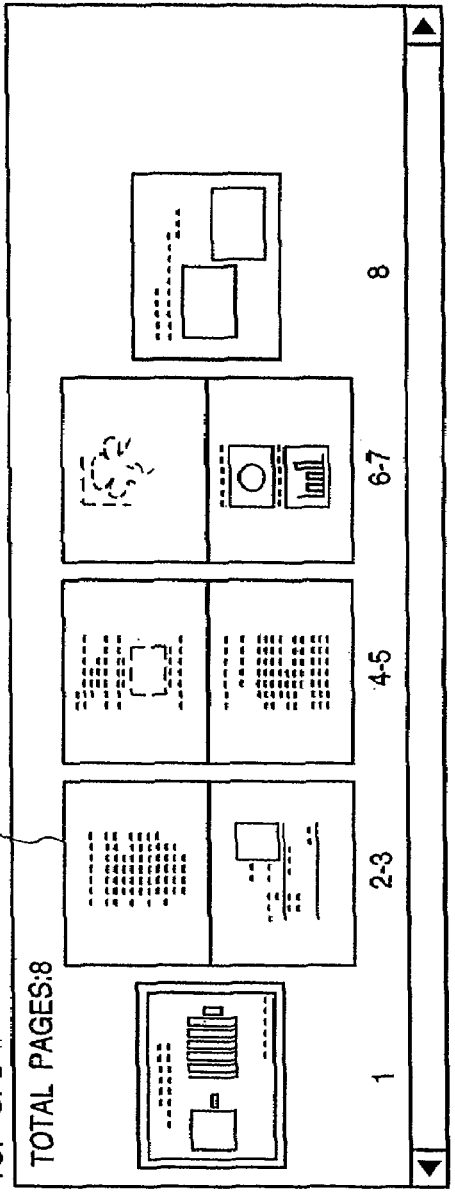
FIG. 34B shows an example of a preview window in case of top open.

In FIG. 27, after the layout setups are acquired in step S2701, it is checked in step S2702 if the open direction after bookbinding is set to be "top open". If YES in step S2702, a template of a top open page for bookbinding print is acquired in step S2704. FIG. 34B shows an example of a preview window of a document including a total of eight pages which are rendered using the top open page template. The pages are displayed in the order of the first page, second/third page, . . . , in turn from the left side. In the top open bookbinding print preview, since a book has a landscape format, the cover page (first page) and back cover page (eighth page) use a landscape template. Since middle pages are spread in the top direction, a template that can display two pages which are spread vertically to have a horizontal seam as the center is used like a page 3402.

Figure 30:
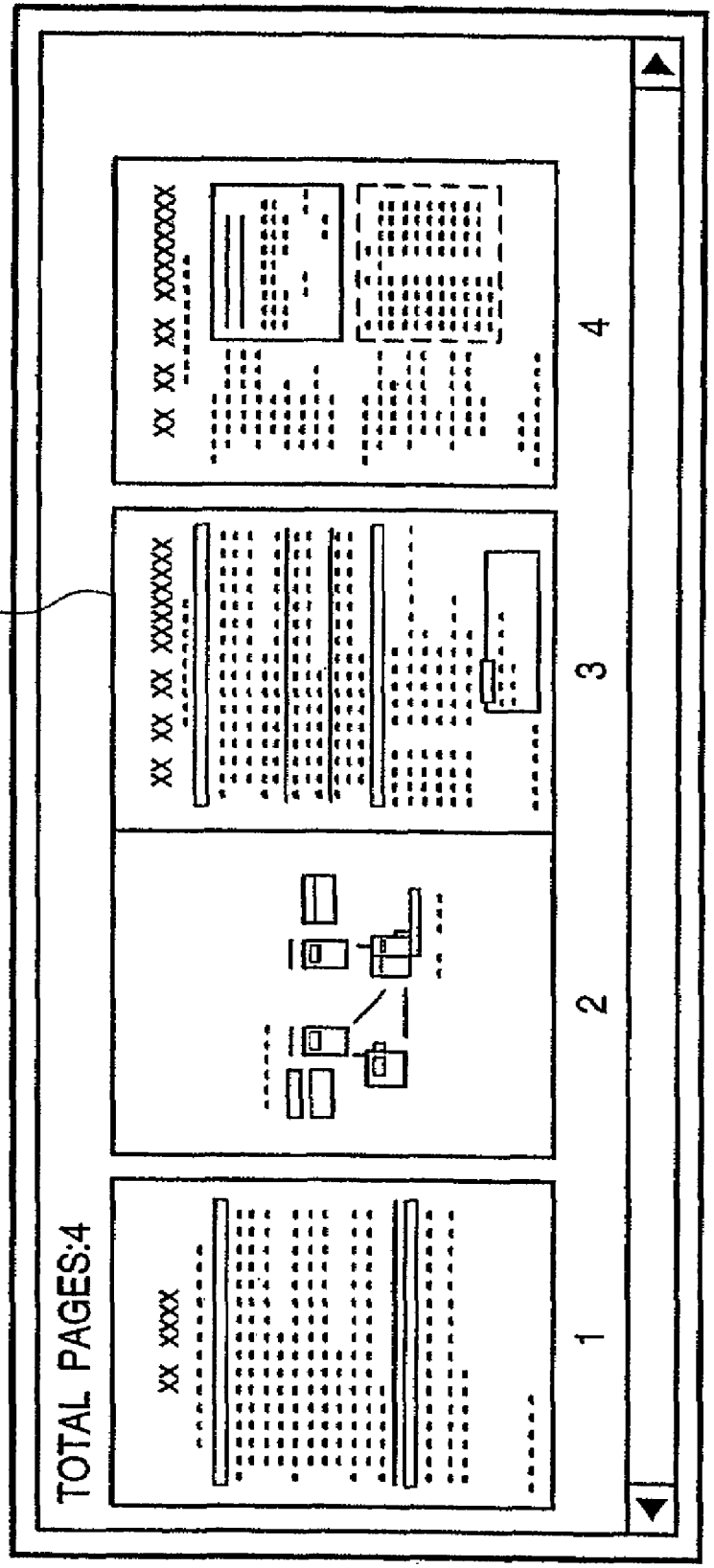
FIG. 30 is a shows an example of a preview window in case of left open.

On the other hand, if the open direction is not set to be "top open", i.e., "right/left open", a page template for right/left open is acquired in step S2703. FIG. 30 shows this example. In this case, since the open direction agrees with the right-and-left direction, a template which can display pages which are spread to have a vertical seam as the center is used like a page 3001. Right or left open need not be distinguished on the template.

The template acquired in this way is rendered in step S2305 in FIG. 23. If cover page insertion is designated, as will be described later, since the cover page is fed from an inserter, it is not a page to be printed, but is displayed as a cover page on the preview window. For this purpose, a template of a cover page to be inserted is also rendered.

(Page Number Rendering for Bookbinding Print)

In FIG. 28, after the layout setups are acquired in step S2801, it is checked in step S2802 if the open direction after bookbinding is set to be "right open". If YES in step S2802, page numbers for right open bookbinding are rendered in step S2805. If NO in step S2802, it is checked step S2803 if left open is set. If YES in step S2803, page numbers for left open bookbinding are rendered in step S2806. If NO in step S2803, since top open is designated, page numbers for top open bookbinding are rendered in step S2804. If a cover page is inserted, no page number is rendered on the cover page to be inserted.

FIG. 30 shows an example of page numbers rendered in case of left open. In this case, the page numbers are assigned along with the progress of pages in turn from the left to the right. FIG. 34A shows an example of page numbers rendered in case of right open. In this case, the page numbers are assigned along with the progress of pages in turn from the right to the left. FIG. 34B shows an example of page numbers rendered in case of top open. In this case, since it is difficult to assign page numbers in correspondence with logical pages in terms of space, page numbers are assigned along with the progress of pages in units of two pages.

(Logical Page Rendering for Bookbinding Print)

After the page templates and page numbers are rendered in FIGS. 27 and 28, the contents of logical pages are rendered in FIG. 29.

In FIG. 29, after the layout setups are acquired in step S2901, it is checked in step S2902 if the open direction after bookbinding is set to be "right open". If YES in step S2902, logical pages for right open bookbinding are rendered in step S2905. If NO in step S2902, it is checked in step S2903 if the open direction after bookbinding is set to be "left open". If YES in step S2903, logical pages for left open bookbinding are rendered in step S2906. If NO in step S2903, since top open is set, logical pages for top open bookbinding are rendered in step S2904.

In order to lay out logical pages as they are designated after bookbinding, the way logical pages are assigned to sheets in bookbinding print changes depending on the presence/absence of designation of face-up/down or bookbinding unit, as described above (in the description of FIG. 22). However, on the preview window, logical pages are displayed in the order of logical pages, i.e., in the order that pages are turned after bookbinding, irrespective of such designation. Note that the designated bookbinding unit is displayed so that it can be understood on the preview window. When cover page insertion is designated, a logical page is not rendered on a cover page to be inserted, but a template indicating a page frame is displayed to indicate the cover page to be inserted. This process will be explained later.

FIG. 30 shows an example of logical pages rendered in case of left open. In this case, logical pages progress in the order that pages are turned, i.e., from the left to the right. FIG. 34A shows an example of right open, and logical pages are laid out to progress rightward to have the leftmost end page as a cover page. FIG. 34B shows an example of top open. Since sheets to be printed are aligned in the horizontal direction on the preview window, they are not laid out from the top to the bottom. However, for sheets, logical pages are laid out in turn from the top to the bottom. That is, the logical pages are laid out in a zigzag pattern from the upper left to the lower right.

Since preview images are displayed in this way, the user can easily confirm the page layout upon bookbinding. That is, it is significant for a normal layout for one- or two-sided print to display preview images of physical pages. However, in bookbinding print, since logical pages are not laid out in turn on physical pages, the user can hardly confirm the output result if he or she previews physical pages. For this reason, when bookbinding print is designated, spread pages are displayed. Also, in a normal layout, the total number of pages (total number of sheets) is displayed, but the total number of logical pages is displayed in bookbinding print.

Since preview images of logical pages are displayed in the order from the right to the left upon designating right open, from the left to the right upon designating left open, and from the top to the bottom upon designating top open, it is easy to understand a complete form of bookbinding print.

(Designation of Bookbinding Unit)

In the above description, the order of logical pages is that of spread pages on the preview window irrespective of the designated bookbinding unit. However, different templates are often used to render logical pages depending on the designated bookbinding unit.

FIG. 31 shows an example of preview images when an all-page unit setup is designated to form a book by folding all printed sheets of a document including a total of eight pages once together. When an all-page unit is designated on a window 3101, all pages other than the cover page (first page) and back cover page (eighth page) are displayed as spread pages, as shown in a preview window 3102. Bookbinding print in the all-page unit can be designated by checking a radio button "All Page at Once".

Figure 32:
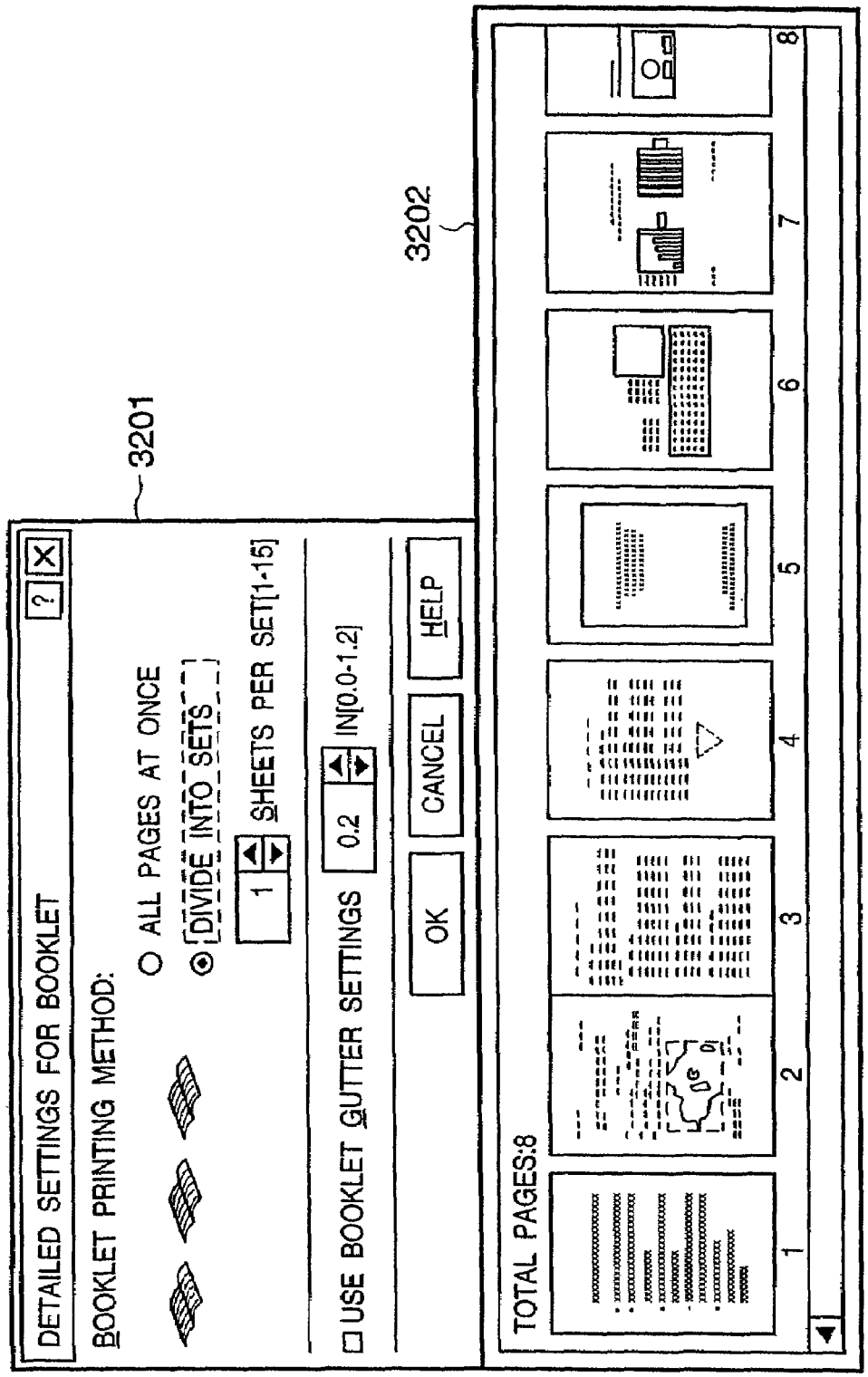
FIG. 32 shows an example of preview images when an N-page print setup is designated.
Figure 33:
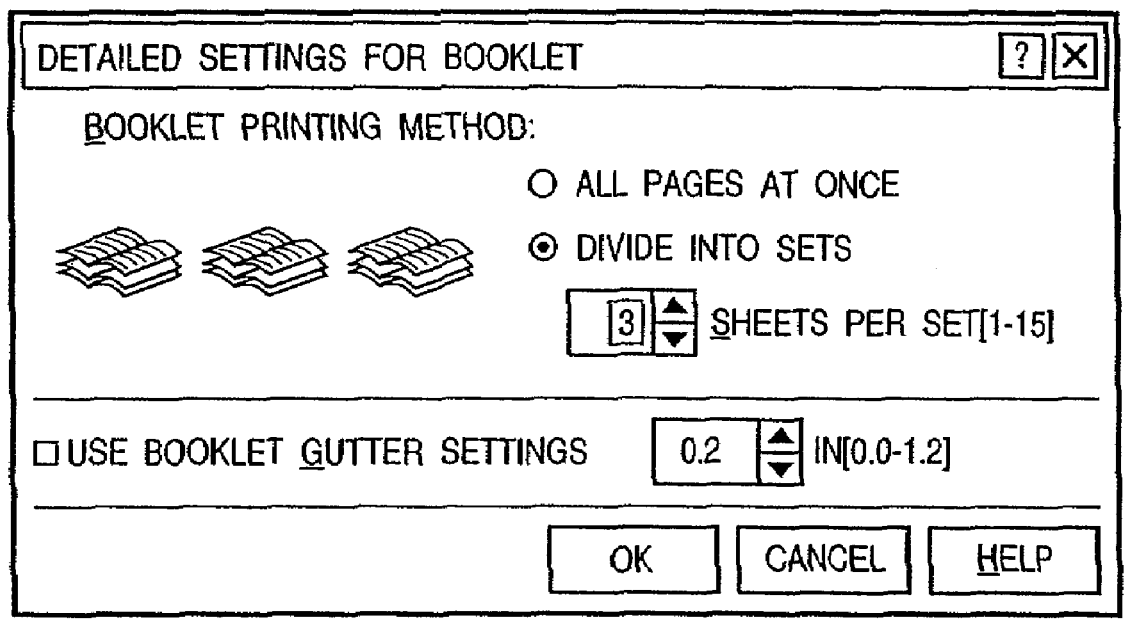
FIG. 33 shows an example of a window when three pages are designated as a bookbinding unit.

FIG. 32 shows an example of preview images when N-sheet print (N=1) which sets a bookbinding unit=1 sheet is designated for a document including a total of eight logical pages. Bookbinding print in units of N sheets can be designated on a window 3201 by checking a radio button "Divide into Sets", and designating the value of N in a "Sheets per Set" field. When N-sheet bookbinding print is designated on the window 3201, pages are displayed so that the user can recognize the cover and back cover pages in units of N sheets. In the example of FIG. 32, the first to fourth pages are to be printed on a single sheet corresponding to the bookbinding unit, and the fifth to eighth pages are to be printed on a single sheet corresponding to the bookbinding unit. The second and third pages are displayed as spread pages, and the sixth and seventh pages are also displayed as spread pages. Since the fourth and fifth pages belong to different bookbinding units, they are displayed with a gap. In this manner, when the number of sheets used as the bookbinding unit is designated, the preview window is displayed while dividing pages in units of bookbinding units. Note that FIG. 33 shows an example of a window when the bookbinding unit=3 sheets is designated.

As a result, even when bookbinding print is designated, the print preview result is displayed before printout, and the operator can confirm it on the window.

(Logical Page Rendering in Cover Page Insertion)

The logical pages in bookbinding print are rendered on the preview window, as described above. When a cover page is to be inserted using an inserter, such designation is considered in the process in steps S2904 to S2906 in FIG. 29.

FIGS. 35 and 36A to 36C show examples of the preview window upon inserting a cover page. If it is determined upon rendering logical pages that cover page insertion is designated, the obverse and reverse surfaces of the cover page to be inserted are rendered as blank pages, and the first logical page is rendered in turn from a page next to the blank page. After subsequent logical pages are rendered, the obverse and reverse surfaces of a cover page to be inserted finally are inserted as blank pages.

Figure 35:
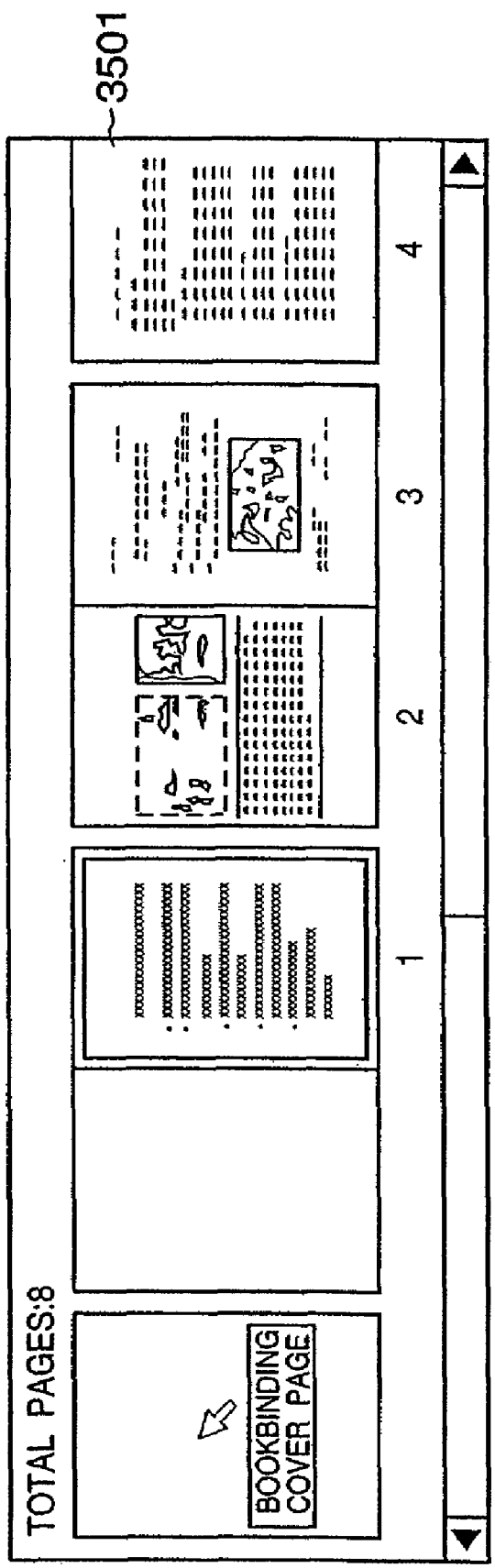
FIG. 35 shows an example of a preview window upon inserting a cover page.

On a display window 3501 in FIG. 35, since left open is designated, first two pages are blank pages since they correspond to the cover page to be inserted, and no page numbers are assigned thereto. In FIG. 35, the cursor is located on the cover page. In this case, a tool tip indicates that the page is the cover page to be inserted, i.e., "bookbinding cover page".

Figure 36A:
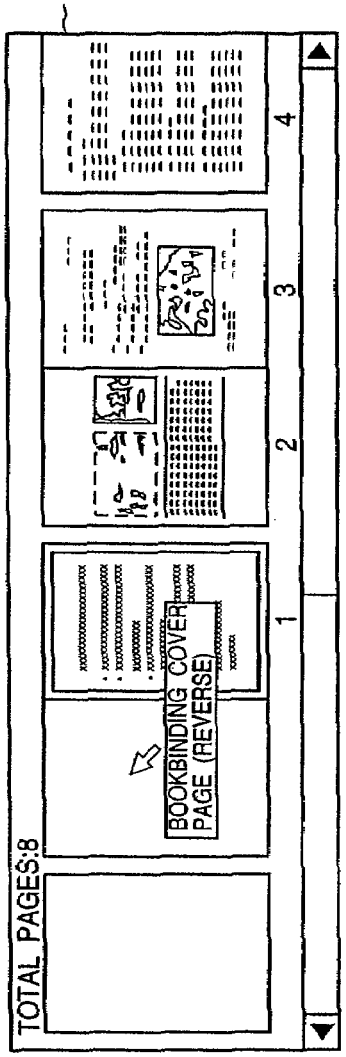
FIGS. 36A to 36C show examples of a preview window upon inserting a cover page.

On a display window 3601 in FIG. 36A, left open is designated, and the cursor is located on the reverse surface of the cover page. In this case, the tool tip displays that the page is the reverse page of the cover page to be inserted, i.e., "bookbinding cover page (reverse)".

Figure 36B:
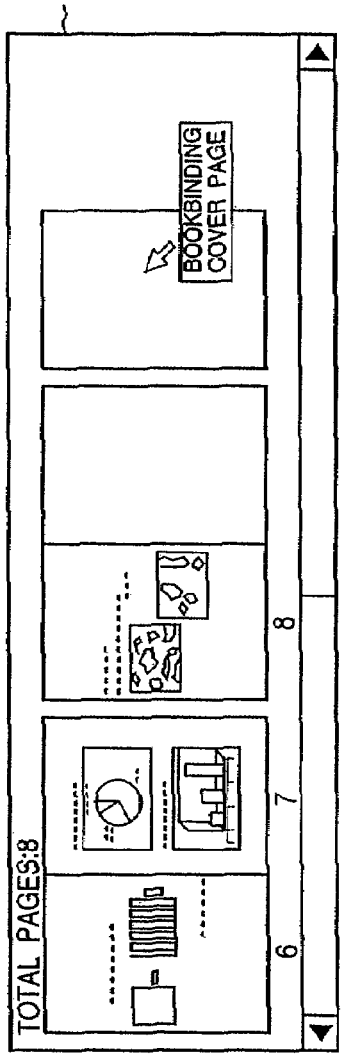

On a display window 3602 in FIG. 36B, pages including those of a back cover page are displayed as preview images. Since the cover page to be inserted also serves as the back cover page when it is folded once, a blank page is displayed as the back cover page. No page number is assigned to this page, either.

Figure 36C:
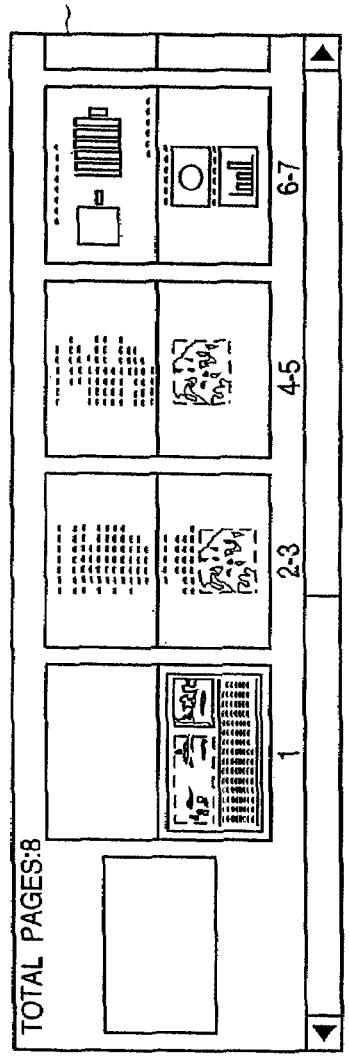

A display window 3603 in FIG. 36C corresponds to a preview window when top open and cover page insertion are designated. In this case, a blank page is displayed as a cover page to be inserted as in left open (also in right open), and logical pages are rendered in turn from the first logical page after that blank page.

In this manner, upon preview of bookbinding print, when a setup is made to insert a cover page from the inserter, preview images including that of the cover page are displayed. Note that this setup is linked to the option attached state of a device and designation of the inserter.

In this manner, when a cover page is inserted from the inserter, the actual output result can be confirmed on the preview window.

As described above, according to the print control method and apparatus of this embodiment, upon displaying preview images of jobs spooled on the host, if bookbinding print is designated, preview images of spread pages are displayed. For this reason, even when bookbinding print is designated, the print result after bookbinding can be confirmed.

Since the number of pages to be displayed as spread pages is changed in correspondence with the designated bookbinding unit, the print result of divided book pages, the output result of which is difficult to be expected, can be confirmed on the preview window.

Since preview images are displayed in the order of the open direction in correspondence with designation of "left open", "right open", and "top open" of bookbinding print, a complete form of a book can be easily understood.

Upon preview of bookbinding print, when a setup is made to insert a cover page from the inserter, preview images including that of the cover page are displayed. In this manner, when a cover page is inserted from the inserter, the actual output result can be confirmed on the preview window.

If a setup is made to insert a middle page by an external device, display that reflects middle insertion is made on the preview window. In this manner, whether or not middle insertion is designated and the middle insertion result can be confirmed on the preview window.

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code that can implement the functions of the above-mentioned embodiments, i.e., the sequences shown in FIGS. 19 to 25 and FIGS. 27 to 29 to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

The present invention is not limited to the above embodiments and various changes and modifications can be made within the spirit and scope of the present invention. Therefore, to apprise the public of the scope of the present invention the following claims are made.

What is claimed is:

1. A preview image displaying method of displaying a preview image performed in an information processing apparatus configured to designate bookbinding printing as a print setting, wherein, when bookbinding printing is designated, document data having logical pages arranged in a predetermined order is printed so that a book produced by stacking a plurality of printed sheets and then folding the stacked sheets into two consists of pages arranged in the predetermined order of the logical page, said method comprising:

a determining step of determining whether the bookbinding printing is designated;

a deciding step of deciding an output order of outputting the logical pages of the document data so that a book produced by stacking a plurality of printed sheets and then folding the stacked sheets into two consists of pages arranged in the predetermined order of the logical page when it is determined that the bookbinding printing is designated in said determining step; and a display control step of displaying a preview image of a logical page in accordance with an order different from the output order determined in said deciding step when it is determined that the bookbinding printing is designated in said determining step and an instruction for displaying the preview image has been accepted.

2. A method according to claim 1, wherein, in said display control step, when the left-to-right direction is designated as an open direction, the preview image is displayed so that respective images of the logical pages facing each other in the book produced in accordance with the bookbinding printing designation are arranged in the left-to-right direction, when the right-to-left direction is designated as the open direction, the preview image is displayed so that respective images of the logical pages facing each other in the book produced in accordance with the bookbinding printing designation are arranged in the right-to-left direction, and when the up-to-down direction is designated as the open direction, the preview image is displayed so that respective images of the logical pages facing each other in the book produced in accordance with the bookbinding printing designation are arranged in the up-to-down direction.

3. A method according to claim 1, wherein, in said display control step, when it is determined that the bookbinding printing is not designated in said determining step, the preview image is displayed in accordance with the output order decided in said deciding step.

4. A method according to claim 1, further comprising:

a storing step of storing rendering instructions into storage in a unit of logical page in accordance with a print instruction from an application; and a generating step of reading the rendering instructions from the storage in the unit of logical page in accordance with the output order decided in said deciding step and then generating print data.

5. A method according to claim 1, wherein, in said display control step, the preview image including a front page of the book is displayed when it is determined that the bookbinding printing is designated and insertion of the front page is instructed.

6. An information processing apparatus configured to designate bookbinding printing as a print setting and displaying a preview image, wherein, when bookbinding printing is designated, document data having logical pages arranged in a predetermined order is printed so that a book produced by stacking a plurality of printed sheets and then folding the stacked sheets into two consists of pages arranged in the predetermined order of the logical page, said apparatus comprising:
 a determining unit adapted to determine whether the bookbinding printing is designated;
 a deciding unit adapted to decide an output order of outputting the logical pages of the document data so that a book produced by stacking a plurality of printed sheets and then folding the stacked sheets into two consists of pages arranged in the predetermined order of the logical page when it is determined that the bookbinding printing is designated by said determining unit, and
 a display control unit adapted to display a preview image of a logical page in accordance with an order different from the output order determined by said deciding unit when it is determined that the bookbinding printing is designated by said determining unit and an instruction for displaying the preview image has been accepted.

7. An apparatus according to claim 6, wherein, by said display control unit,
 when the left-to-right direction is designated as an open direction, the preview image is displayed so that respective images of the logical pages facing to each other in the book produced in accordance with the bookbinding printing designation are arranged in the left-to-right direction,
 when the right-to-left direction is designated as the open direction, the preview image is displayed so that respective images of the logical pages facing to each other in the book produced in accordance with the bookbinding printing designation are arranged in the right-to-left direction, and
 when the up-to-down direction is designated as the open direction, the preview image is displayed so that respective images of the logical pages facing to each other in the book produced in accordance with the bookbinding printing designation are arranged in the up-to-down direction.

8. An apparatus according to claim 6, wherein, by said display control unit, when it is determined that the bookbinding printing is not designated by said determining unit, the preview image is displayed in accordance with the output order decided by said deciding unit.

9. An apparatus according to claim 6, further comprising:
 a storing unit adapted to store rendering instructions into a storage in a unit of logical page in accordance with a print instruction from an application; and
 a generating unit adapted to read the rendering instructions from the storage in the unit of logical page in accordance with the output order decided by said deciding unit and then generating print data.

10. An apparatus according to claim 6, wherein, by said display control unit, the preview image including a front page of the book is displayed when it is determined that the bookbinding printing is designated and insertion of the front page is instructed.

11. A computer-readable storage medium in which a program is stored, said program being executed by a computer to perform a preview image displaying method of displaying a preview image performed in an information processing apparatus configured to designate bookbinding printing as a print setting, wherein, when bookbinding printing is designated, document data having logical pages arranged in a predetermined order is printed so that a book produced by stacking a plurality of printed sheets and then folding the stacked sheets into two consists of pages arranged in the predetermined order of the logical page, said method comprising:
 a determining step of determining whether the bookbinding printing is designated;
 a deciding step of deciding an output order of outputting the logical pages of the document data so that a book produced by stacking a plurality of printed sheets and then folding the stacked sheets into two consists of pages arranged in the predetermined order of the logical page when it is determined that the bookbinding printing is designated in said determining step, and
 a display control step of displaying a preview image of a logical page in accordance with an order different from the output order determined in said deciding step when it is determined that the bookbinding printing is designated in said determining step and an instruction for displaying the preview image has been accepted.

12. A medium according to claim 11, wherein, in said display control step,
 when the left-to-right direction is designated as an open direction, the preview image is displayed so that respective images of the logical pages facing to each other in the book produced in accordance with the bookbinding printing designation are arranged in the left-to-right direction,
 when the right-to-left direction is designated as the open direction, the preview image is displayed so that respective images of the logical pages facing to each other in the book produced in accordance with the bookbinding printing designation are arranged in the right-to-left direction, and
 when the up-to-down direction is designated as the open direction, the preview image is displayed so that respective images of the logical pages facing to each other in the book produced in accordance with the bookbinding printing designation are arranged in the up-to-down direction.

13. A medium according to claim 11, wherein, in said display control step, when it is determined that the bookbinding printing is not designated in said determining step, the preview image is displayed in accordance with the output order decided in said deciding step.

14. A medium according to claim 11, further comprising:
 a storing step of storing rendering instructions into a storage in a unit of logical page in accordance with a print instruction from an application; and
 a generating step of reading the rendering instructions from the storage in the unit of logical page in accordance with the output order decided in said deciding step and then generating print data.

15. A medium according to claim 11, wherein, in said display control step, the preview image including a front page of the book is displayed when it is determined that the bookbinding printing is designated and insertion of the front page is instructed.

16. A preview image displaying method performed in an information processing apparatus configured to designate bookbinding printing as a print setting, wherein, when bookbinding printing is designated, document data having logical pages arranged in a predetermined order is printed so that a book produced by stacking a plurality of printed sheets and then folding the stacked sheets into two consists of pages arranged in the predetermined order of the logical page, said method comprising:

a determining step of determining whether the bookbinding printing is designated; and a display control step of, when it is determined that the bookbinding printing is designated in said determining step, displaying a preview image of a second logical page allocated on a half of a reverse side of a second sheet next to a preview image of a first logical page allocated on a half of a front side of a first sheet.

17. A preview image displaying apparatus configured to designate bookbinding printing as a print setting, wherein, when bookbinding printing is designated, document data having logical pages arranged in a predetermined order is printed so that a book produced by stacking a plurality of printed sheets and then folding the stacked sheets into two consists of pages arranged in the predetermined order of the logical page, said method comprising:

a determining unit adapted to determine whether the bookbinding printing is designated; and a display control unit adapted to, when it is determined that the bookbinding printing is designated by said determining unit, display a preview image of a second logical page allocated on a half of a reverse side of a second sheet next to a preview image of a first logical page allocated on a half of a front side of a first sheet.

18. A preview image displaying method performed in an information processing apparatus configured to communicate with a printing apparatus, said method comprising:

a designating step of designating bookbinding printing, wherein, when the bookbinding printing is designated, a book is produced by stacking a first bookbinding unit in which a printed sheet is folded into two and a second bookbinding unit in which a printed sheet is folded into two; and a displaying step of, when the bookbinding printing is designated in said designating step and an instruction for displaying the preview image has been accepted, displaying the preview image of a spread of the book, wherein the preview image of the spread of the book on which a last page of the first bookbinding unit and a first page of the second bookbinding unit are arranged is a preview image in which it is recognizable that the last page of the first bookbinding unit and the first page of the second bookbinding unit are included in different bookbinding units.

19. An information processing apparatus for displaying a preview image, the information processing apparatus configured to communicate with a printing apparatus, the information processing apparatus comprising:

a designation unit configured to designate bookbinding printing, wherein, when the bookbinding printing designated, a book is produced by stacking a first bookbinding unit in which that a printed sheet is folded into two and a second bookbinding unit in which a printed sheet is folded into two; and a displaying unit configured to, when the bookbinding printing is designated by said designating unit and an instruction for displaying the preview image has been accepted, display the preview image of a spread of the book, wherein the preview image of the spread of the book on which a last page of the first bookbinding unit is arranged is a preview image in which it is recognizable that the last page of the first bookbinding unit and the first page of the second bookbinding unit are included in different bookbinding units.

20. A computer-readable storage medium storing a computer-executable program of an information processing apparatus displaying a preview image, the information processing apparatus configured to communicate with a printing apparatus, said program comprising:

code for a designating step of designating bookbinding printing, wherein, when the bookbinding printing is designated, a book is produced by stacking a first bookbinding unit in which a printed sheet is folded into two and a second bookbinding unit in which a printed sheet is folded into two; and code for a display step of, when the bookbinding printing is determined in said designating step and an instruction for displaying the preview image has been accepted, displaying the preview image of a spread of the book, wherein the preview image of the spread of the book on which a last page of the first bookbinding unit and a first page of the second bookbinding unit are arranged is a preview image in which it is recognizable that the last page of the first bookbinding unit and the first page of the second bookbinding unit are included in different bookbinding units.

21. A computer-readable storage medium storing a computer-executable program for a preview image displaying method performed in an information processing apparatus configured to designate bookbinding printing as a print setting, wherein, when bookbinding printing is designated, document data having logical pages arranged in a predetermined order is printed so that a book produced by stacking a plurality of printed sheets and then folding the stacked sheets into two consists of pages arranged in the predetermined order of the logical page, said program comprising:

code for a determining step of determining whether the bookbinding printing is designated; and code for a display control step of, when it is determined that the bookbinding printing is designated in said determining step, displaying a preview image of a second logical page allocated on a half of a reverse side of a second sheet next to a preview image of a first logical page allocated on a half of a front side of a first sheet.

22. A method according to claim 18, wherein there is displayed in said displaying step the preview image of the spread of the book on which a last page of the first bookbinding unit and a first page of the second bookbinding unit are separated.

23. An apparatus according to claim 19, wherein there is displayed in said displaying unit the preview image of the spread of the book on which a last page of the first bookbinding unit and a first page of the second bookbinding unit are separated.

24. A medium according to claim 20, wherein there is displayed in said displaying code the preview image of the spread of the book on which a last page of the first bookbinding unit and a first page of the second bookbinding unit are separated.

* * * * *